(12) United States Patent
Vance et al.

(10) Patent No.: US 11,555,423 B2
(45) Date of Patent: Jan. 17, 2023

(54) MULTI-MODE VALVE LIFT

(71) Applicant: Eaton Intelligent Power Limited, Dublin (IE)

(72) Inventors: Matthew A. Vance, Kalamazoo, MI (US); Nicola Andrisani, Turin (IT); Nilesh L. Bagal, Novi, MI (US); Andrei D. Radulescu, Marshall, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 148 days.

(21) Appl. No.: 16/961,795

(22) PCT Filed: Jan. 11, 2019

(86) PCT No.: PCT/EP2019/050638
§ 371 (c)(1),
(2) Date: Jul. 13, 2020

(87) PCT Pub. No.: WO2019/138039
PCT Pub. Date: Jul. 18, 2019

(65) Prior Publication Data
US 2021/0071594 A1 Mar. 11, 2021

Related U.S. Application Data

(60) Provisional application No. 62/741,815, filed on Oct. 5, 2018, provisional application No. 62/662,672, filed (Continued)

(51) Int. Cl.
*F01L 1/18* (2006.01)
*F02D 13/02* (2006.01)
(Continued)

(52) U.S. Cl.
CPC .......... *F01L 1/185* (2013.01); *F02D 13/0257* (2013.01); *F01L 13/0005* (2013.01);
(Continued)

(58) Field of Classification Search
CPC .. F02D 13/06; F02D 13/0211; F02D 41/0087; F02D 13/0257; F02D 2041/001;
(Continued)

(56) References Cited

U.S. PATENT DOCUMENTS

2005/0183693 A1  8/2005  Yang et al.
2006/0150952 A1  7/2006  Yang et al.
(Continued)

FOREIGN PATENT DOCUMENTS

CN   101861446 A   10/2010
CN   105508061 A    4/2016
(Continued)

OTHER PUBLICATIONS

Machine Translation DE10 2010 007023 (Year: 2011).*
International Search Report and Written Opinion for PCT/EP2019/050638 dated May 21, 2019; pp. 1-27.

Primary Examiner — Jorge L Leon, Jr.
(74) Attorney, Agent, or Firm — Pearne & Gordon LLP

(57) ABSTRACT

An overhead cam engine system comprises a rotating overhead exhaust cam rail comprising a plurality of exhaust lobes. A first switching roller finger follower actuates a first exhaust valve, and is configured to switch between a first lift profile and a second lift profile. A second switching roller finger follower is coupled to actuate a second exhaust valve, and is configured to switch between a third lift profile and a fourth lift profile. The third and fourth lift profile are different than the first and second lift profile. An actuation assembly is connected to switch the first switching roller finger follower and the second switching roller finger fol-
(Continued)

lower to select between at least three exhaust lift modes to open and close the first exhaust valve and the second exhaust valve using combinations of the first, second, third and fourth lift profiles.

13 Claims, 20 Drawing Sheets

Related U.S. Application Data on Apr. 25, 2018, provisional application No. 62/645,430, filed on Mar. 20, 2018, provisional application No. 62/616,334, filed on Jan. 11, 2018.

(51) Int. Cl.
  *F01L 1/053* (2006.01)
  *F02D 13/06* (2006.01)
  *F01L 13/00* (2006.01)

(52) U.S. Cl.
  CPC . *F01L 2001/0537* (2013.01); *F01L 2001/186* (2013.01); *F01L 2800/06* (2013.01); *F01L 2800/08* (2013.01); *F02D 13/06* (2013.01)

(58) Field of Classification Search
  CPC ..... F01L 2305/00; F01L 1/185; F01L 1/2405; F01L 2001/0537; F01L 2001/186; F01L 2001/467; F01L 2013/001; F01L 13/0005; F01L 13/0036; F01L 2800/06; F01L 2800/08; F02B 2023/102; F02B 2023/108; Y02T 10/12
  USPC ......... 123/90.16, 90.27, 90.39, 90.41, 90.43, 123/90.44, 198 F
  See application file for complete search history.

(56) References Cited

U.S. PATENT DOCUMENTS

| | | | |
|---|---|---|---|
| 2013/0145832 A1* | 6/2013 | Fedewa | F01L 13/0036 73/114.79 |
| 2016/0032846 A1 | 2/2016 | Boyer et al. | |

FOREIGN PATENT DOCUMENTS

| | | |
|---|---|---|
| DE | 102010007023 A1 | 8/2011 |
| EP | 1643098 A1 | 4/2006 |
| JP | S59025013 | 2/1984 |
| JP | 084504 A | 1/1996 |
| JP | 2008075569 A | 4/2008 |
| WO | WO-2016/077246 A1 | 5/2013 |
| WO | WO-2013/140998 A1 | 9/2013 |
| WO | 2018068041 A1 | 4/2018 |

* cited by examiner

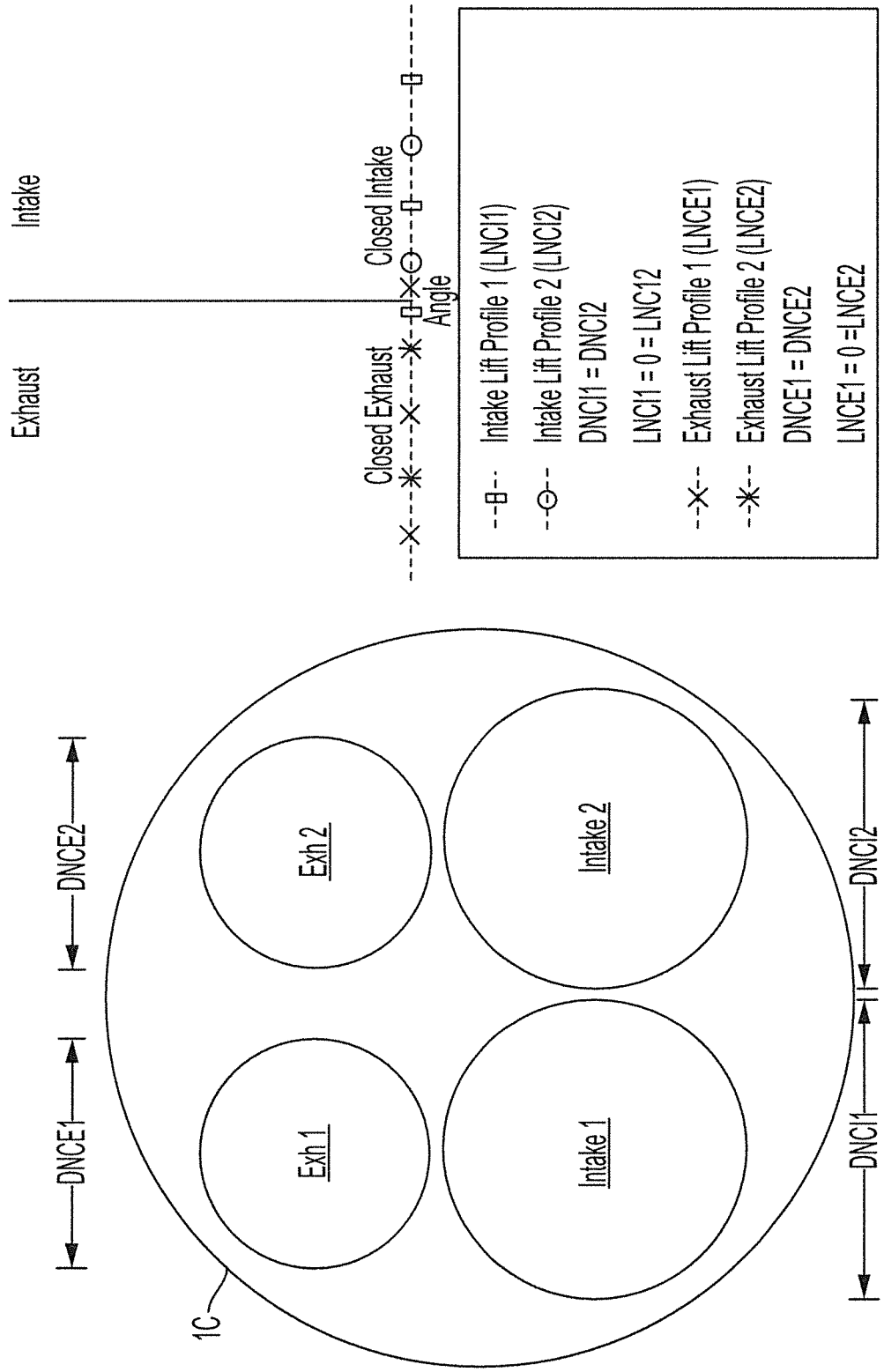

D1 > D2
LE1I1 = HIGHER
LE2I1 = CDA
LE2I2 = SHORTER/ EIVC
LE2I2 = CDA
D3 > D4
LL1E1 = HIGHER
LL2E1 = CDA
LL1E2 = SHORTER/ LEVO
LL2E2 = CDA

MULTI-MODE VALVE LIFT

This is a § 371 National Stage entry of PCT/EP2019/050638, filed Jan. 11, 2019, which claims the benefit of priority of U.S. provisional patent applications 62/616,334 filed Jan. 11, 2018, 62/645,430 filed Mar. 20, 2018, 62/662,672 filed Apr. 25, 2018, and 62/741,815 Oct. 5, 2018, all of which are incorporated herein by reference.

FIELD

This application provides systems and methods for enabling an overhead cam engine to operate with multiple modes on one or more cylinders.

BACKGROUND

Systems for type II (overhead cam, "OHC") engines can suffer from complex systems when attempting to permit multiple modes of operation. It is difficult to synchronize solutions with the overhead cam rail. So, such engines can be restricted to only one mode of variable valvetrain operation such as a normal mode and either cylinder deactivation or early intake valve closing. However, it is desired to offer all three modes using the existing cam rail.

SUMMARY

An overhead cam engine system, comprises an engine block comprising a first in-line cylinder and a second in-line cylinder, each of the first and second in-line cylinders comprising a cylinder head comprising a first intake port and a second intake port and a first exhaust port and a second exhaust port. A reciprocating piston assembly comprises a plurality of pistons for reciprocating in respective ones of the plurality of in-line cylinders. A rotating overhead intake cam rail comprises a plurality of intake lobes, the plurality of intake lobes comprising, respectively for each of the first in-line cylinder and the second in-line cylinder, a first set and a second set of intake actuation lobes for rotating above the first intake port and for rotating above the second intake port. A rotating overhead exhaust cam rail comprises a plurality of exhaust lobes, the plurality of exhaust lobes comprising, respectively for each of the first in-line cylinder and the second in-line cylinder, a first set and a second set of exhaust actuation lobes for rotating above the first exhaust port and for rotating above the second exhaust port. A first switching roller finger follower is coupled to follow the first set of intake actuation lobes to actuate the first intake valve connected to open and close the first intake port of the first in-line cylinder, and the first switching roller finger follower is configured to switch between a first lift profile and a second lift profile. A second switching roller finger follower is coupled to follow the second set of intake actuation lobes to actuate the second intake valve connected to open and close the second intake port of the first in-line cylinder, and the second switching roller finger follower is configured to switch between a third lift profile and a fourth lift profile, the third and fourth lift profile different than the first and second lift profile. An actuation assembly is connected to switch the first switching roller finger follower and the second switching roller finger follower to select between at least three intake lift modes to open and close the first intake valve and the second intake valve using combinations of the first, second, third and fourth lift profiles.

The first lift profile and the fourth lift profile can be selected by the actuation assembly to enable an early intake valve closing intake lift mode of the at least three intake lift modes.

The first lift profile can be a nominal lift profile, the second lift profile can be a partial lift profile, the third lift profile can be less than the normal lift profile, and the fourth lift profile can be a zero lift profile. The actuation assembly can be connected to select the second lift profile together with the fourth lift profile to implement a partial lift cylinder deactivation mode.

An overhead cam engine system can alternatively comprise an engine block comprising a first in-line cylinder and a second in-line cylinder, each of the first and second in-line cylinders comprising a cylinder head comprising a first exhaust port and a second exhaust port and a first exhaust port and a second exhaust port. A reciprocating piston assembly can comprise a plurality of pistons for reciprocating in respective ones of the plurality of in-line cylinders. A rotating overhead exhaust cam rail can comprise a plurality of exhaust lobes, the plurality of exhaust lobes comprising, respectively for each of the first in-line cylinder and the second in-line cylinder, a first set and a second set of exhaust actuation lobes for rotating above the first exhaust port and for rotating above the second exhaust port. A first switching roller finger follower can be coupled to follow the first set of exhaust actuation lobes to actuate the first exhaust valve connected to open and close the first exhaust port of the first in-line cylinder, and the first switching roller finger follower is configured to switch between a first lift profile and a second lift profile. A second switching roller finger follower can be coupled to follow the second set of exhaust actuation lobes to actuate the second exhaust valve connected to open and close the second exhaust port of the first in-line cylinder, and the second switching roller finger follower is configured to switch between a third lift profile and a fourth lift profile, the third and fourth lift profile different than the first and second lift profile. An actuation assembly can be connected to switch the first switching roller finger follower and the second switching roller finger follower to select between at least three exhaust lift modes to open and close the first exhaust valve and the second exhaust valve using combinations of the first, second, third and fourth lift profiles.

The first lift profile can be a nominal lift profile, the second lift profile can be a zero lift profile, the third lift profile can be smaller than the nominal lift profile, and the fourth lift profile can be a zero lift profile, and the actuation assembly can be connected to select the second lift profile and the third lift profile to implement a late exhaust valve opening mode.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

BRIEF DESCRIPTION OF THE DRAWINGS

FIGS. 5A-9C are views of cylinder roofs and valve lift profiles for implementing the multi-mode valve lift according to the disclosure.

DETAILED DESCRIPTION

Figure 2:
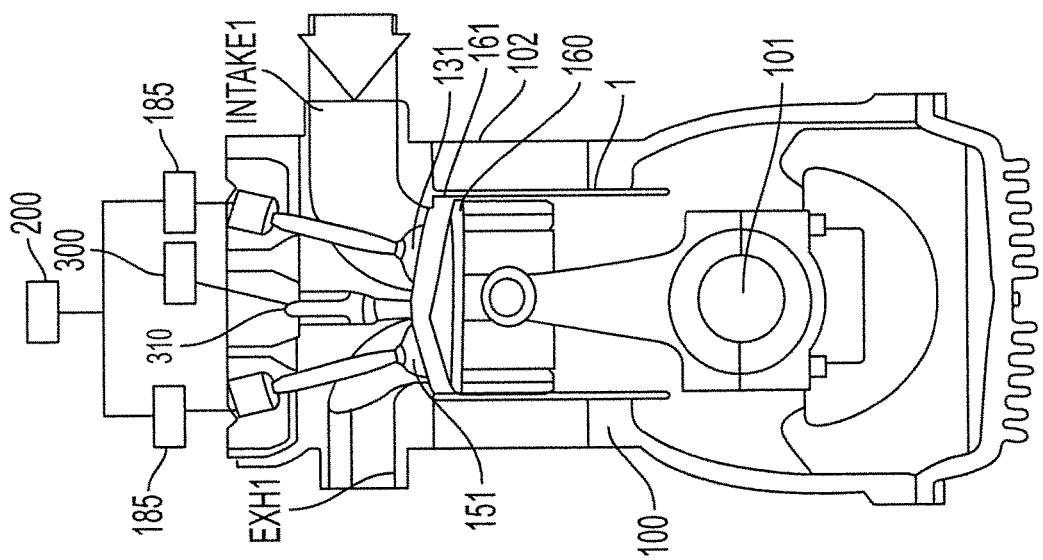
FIG. 2 is a cross-section view of a cylinder.

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures.

The systems and methods disclosed herein have applicability to both diesel and gasoline engines. In type II (overhead cam, "OHC") engines, a row of cylinders 1-4 can be in-line with a first cam rail 182 for actuating the intake valves 130 and a second cam rail 183 for actuating the exhaust valves 150. "In-line" as used herein to describe the cylinders 1-4, comprises cylinders parallel to one or both overhead cam rails 182, 183 or parallel to the major axis of the crankshaft 101, or parallel to both an overhead cam rail and the major axis of the crankshaft. A four cylinder engine is shown in partial view in FIG. 1 and schematically in FIG. 12, but the disclosure is not limited to 4 cylinder configurations. Other numbers of valves and cylinders can be used according to the teachings of the disclosure, such as 6 or 8 cylinders, among others. While a working example disclosed herein can include engine size, stroke, torque output, or fuel consumption, the teachings of the disclosure can be scaled and modified to be applied to other sizes, strokes, torque outputs, fuel consumption, among others variable aspects of diesel and gasoline engines.

The crankshaft 101 can comprise a number of counterweights and piston connections to reciprocate pistons 160 within the cylinders 1-4. Each cylinder 1-4 can comprise a roof 161 that can be structured according to FIGS. 5A, 6A, 7A, 8A, 8E or variations consistent with the disclosure herein. Two intake valves 130 can open and close two intake ports INTAKE 1, INTAKE 2 and two exhaust valves 150 can open and close two exhaust ports EXH1, EXH2. Rocker arms, including roller finger followers ("RFF") or switching roller finger followers ("SRFF"), can be used to transfer forces from the overhead cam rails 182, 182 to the valves.

Figure 3A:
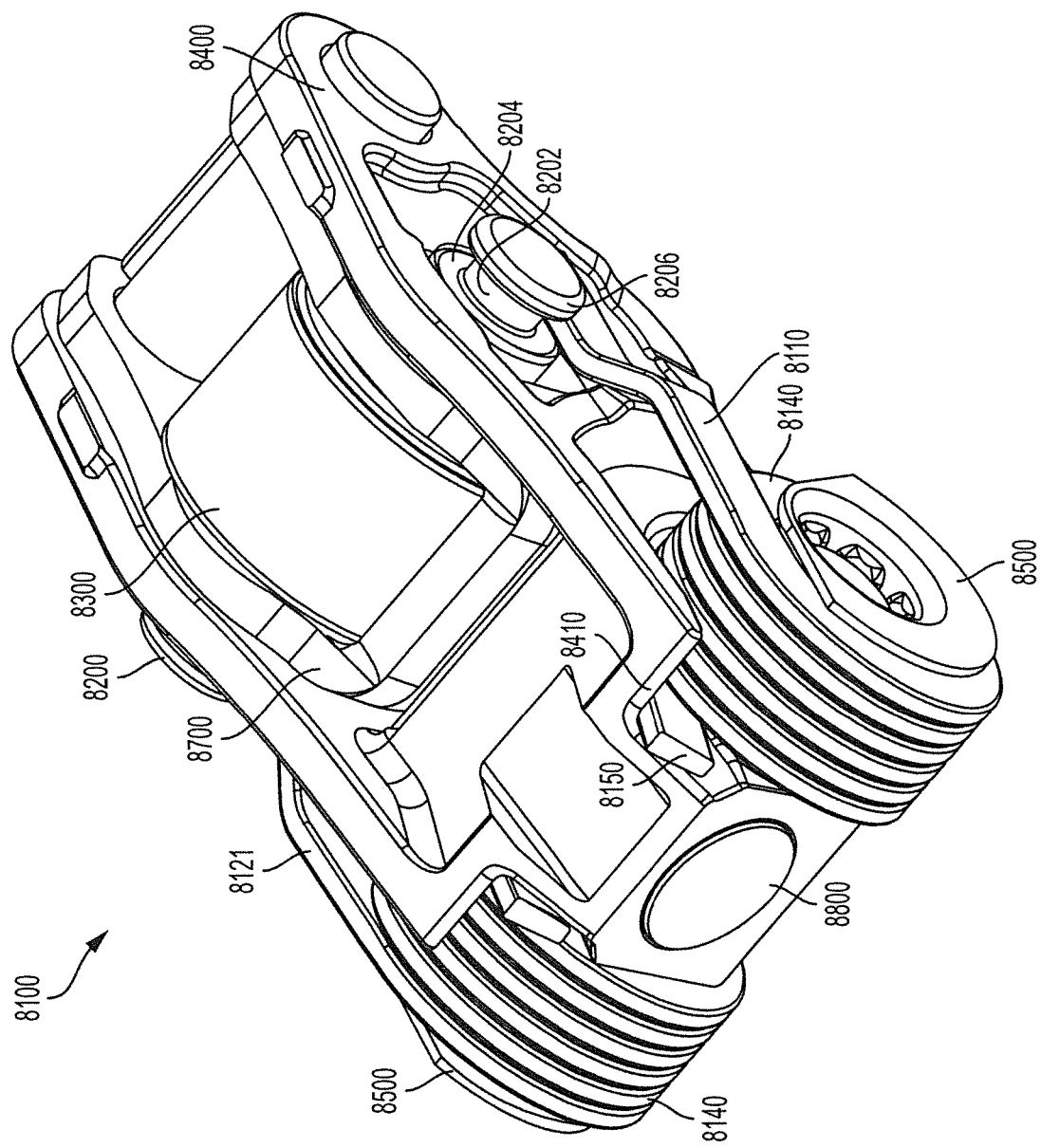
FIGS. 3A-3C are views of a switching roller finger follower.
Figure 4:
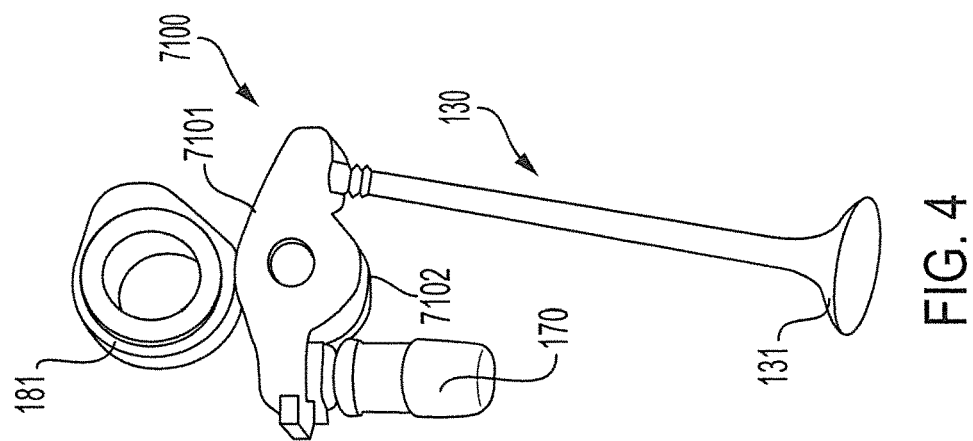
FIG. 4 is a view of a roller finger follower.

Numerous rocker arm alternatives exist, including but not limited to WO 2018/068041 and progeny, and additional rocker arm examples are shown in FIGS. 3A-4. FIG. 4 shown a roller finger follower 7100 in relation to a rockable sleeve 7101, an internal roller 7102, a mounted hydraulic device 170 such as hydraulic lash adjuster, cam lobe 181, and an intake valve 130 comprising stem and head 131. Head 131 motion can be controlled to open and close intake port INTAKE1. The roller finger follower 710 can be interleaved on the valvetrain as described in more detail below to provide basic valve opening and closing functionality.

Figure 3B:
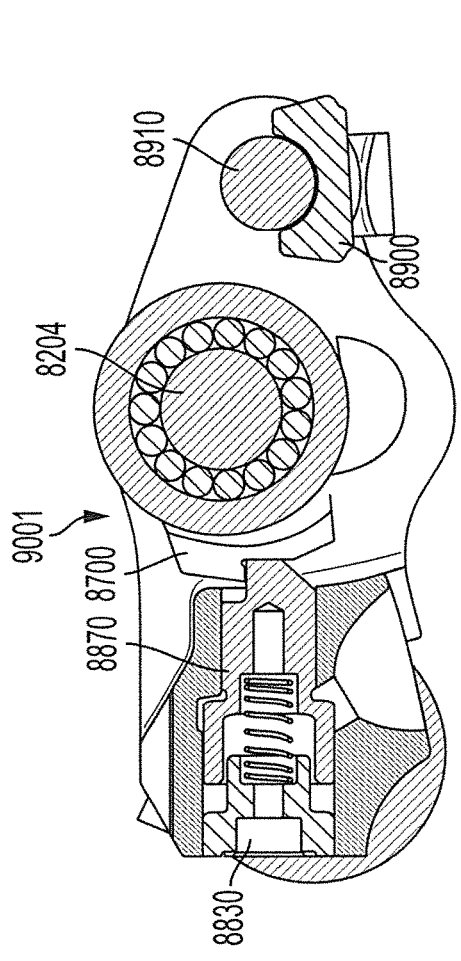
Figure 3C:
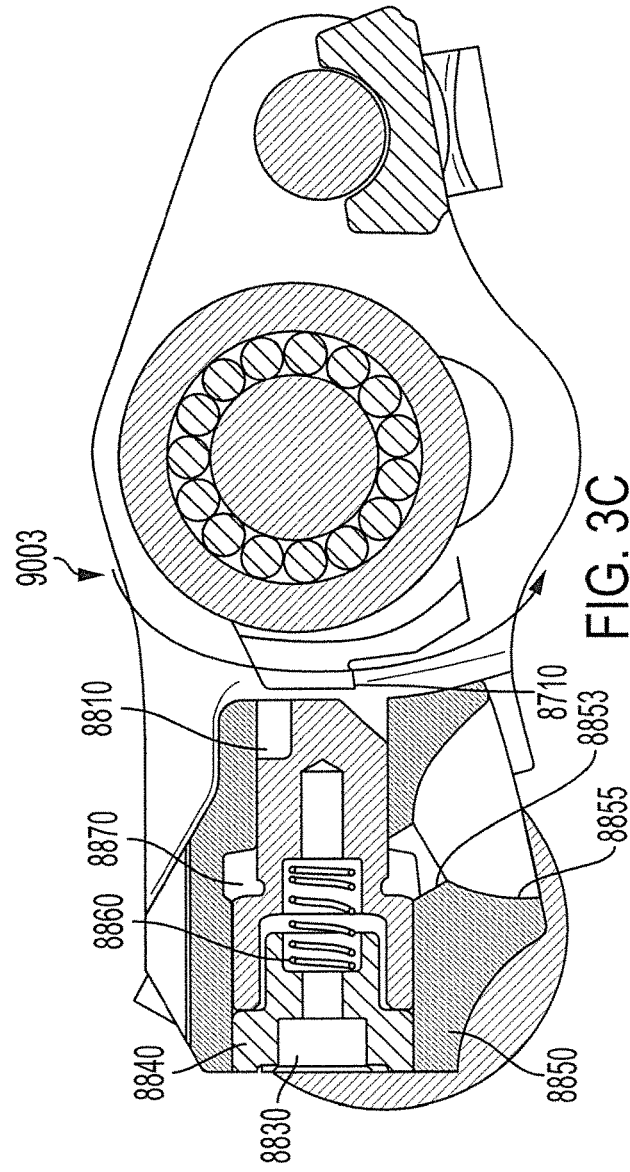

A more complex rocker arm is shown in FIGS. 3A-3C. This rocker arm is "switchable," and thus constitutes a type of switching roller finger follower 8100. Outer arms 8400 can in some instances comprise slider pads or cantilevered rollers, but in this instance comprise pivot side springs 8140 near a latch body 8850. By latching and unlatching a latch seat 8710 on an inner arm 8700 so that inner arm 8700 pivots on axis 8910 with respect to the outer arm 8400, different valve motions can be employed, such as lost motion, high lift, or low lift events, and techniques such as cylinder deactivation ("CDA"), early valve opening or closing, extended valve opening or closing, and combinations thereof can be enabled. That is, the switchable roller finger follower 8100 can enable a switch from a nominal lift to a lost motion lift, and thus permit a valve to open and close normally or to be deactivated for enabling CDA. Or, a valve can switch from a nominal lift to a high or low lift. A latch assembly is shown such that pressurized fluid from a hydraulic supply 187 to a hydraulic lash adjuster 186 can flow through a lash cup 8855 to a fluid port 8853, and into a chamber 8870. By controlling the fluid ported thus, plug 8840, spring 8860, and latch 8810 cooperate to move the latch 8810 and switch the rocker arm. A fluid port can be coupled to the plug 8830. FIG. 3B shows the latched state 9100 of the switchable roller finger follower. FIG. 3C shows the unlatched state 9003 of the inner arm 8700 with the curved arrow indicating the direction of motion of the inner arm 8700. Valve stem of valve 130 or 150 can seat on valve seat 8900 and transfer rocker arm motions to the valve head 131. Springs 8140 can be biased against a post 8200 or other physical aspect associated with inner arm 8400 to return the inner arm to a latchable position and to enable the inner roller 8300 to follow the cam lobe 181. Inner roller 8300 can be mounted on a roller axis 8204, with posts 8200 comprising extensions 8206 for seating spring ends.

Other latch actuation mechanisms are possible, including electrical assemblies such as e-latch, mechanical assemblies, and electro-mechanical assemblies. One mechanical latch actuation mechanism 185 is shown in FIG. 1B. A latch rail is shown to comprise rotatable latch interfaces 184. When the latch rail is rotated in one position, the latch interfaces 184 can press the latch 8810 to engage the inner arm 8700. With the latch rail rotated to a second position, the latch interfaces 184 move to permit the latch 8810 to retract away from the inner arm 8700. Modifying the plug 8840 so that it can be pushed away from the latch body 8850 by spring 8860 permits this unlatched motion.

Figure 1A:
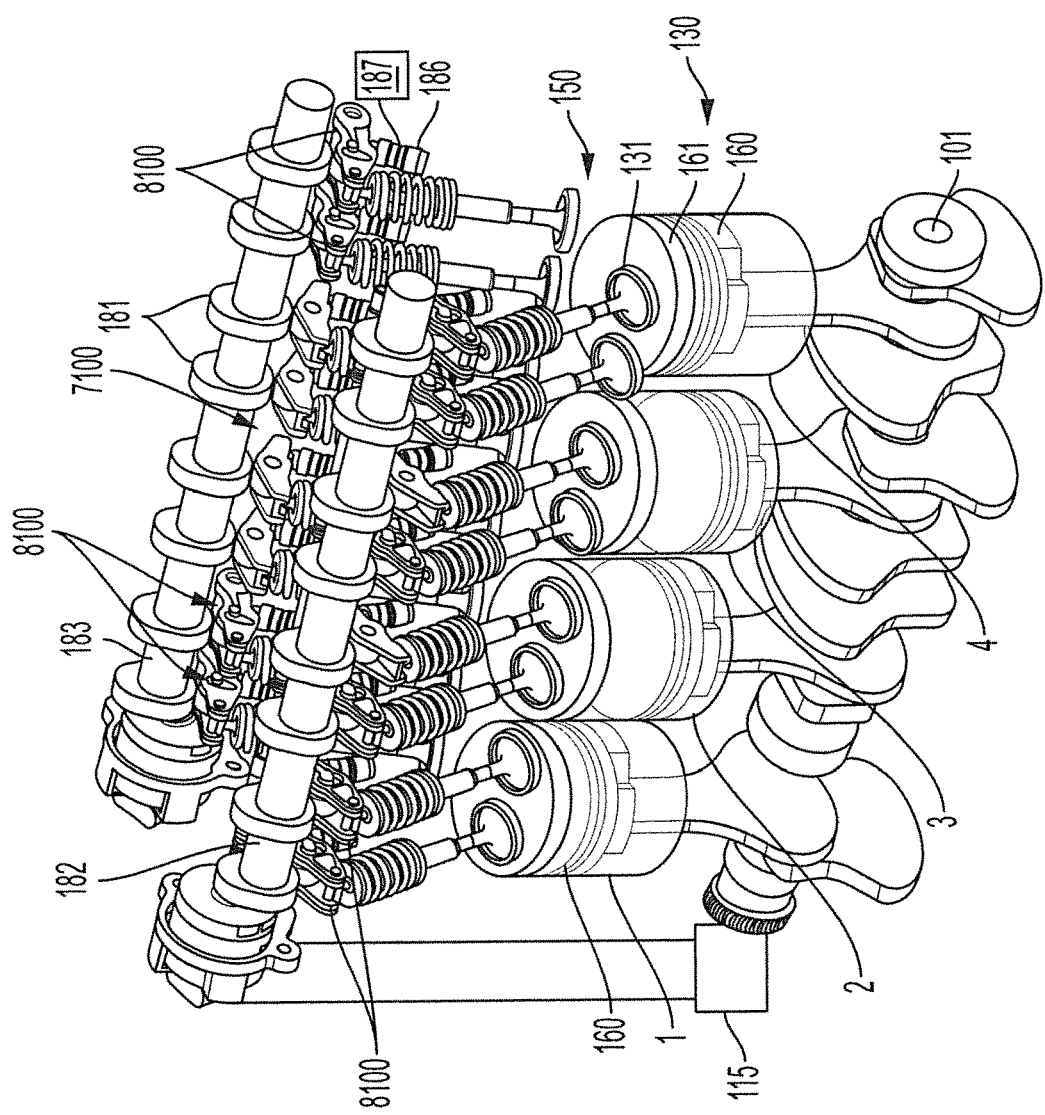
FIGS. 1A & 1B are views of multi-mode valvetrain systems.
Figure 1B:
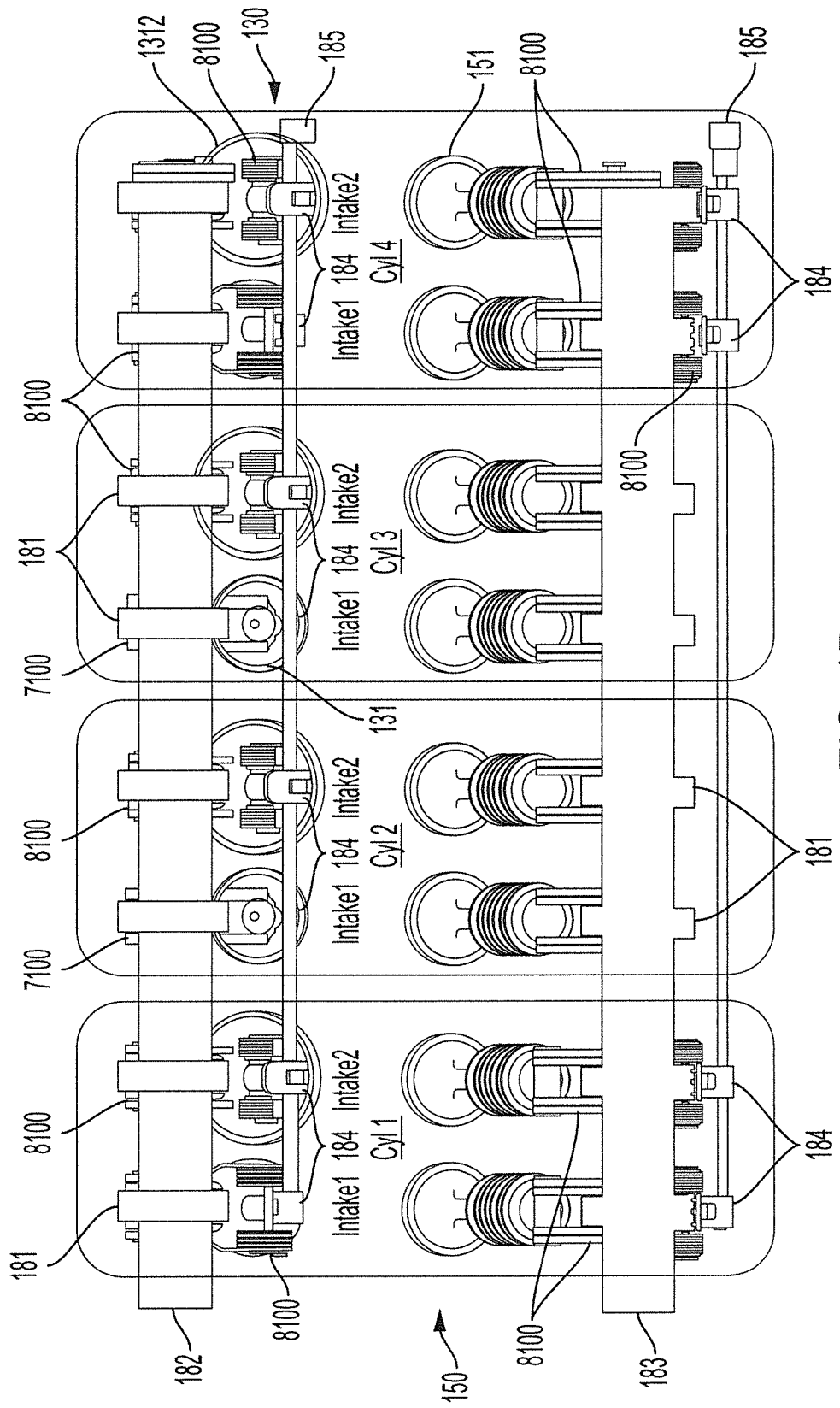

Cylinder 1 is shown in FIG. 2 with the piston 160 at top dead center ("TDC") of a combustion stroke, while FIG. 1A shows pistons 160 for cylinders 2 & 3 at bottom dead center ("BDC"). FIGS. 1A & 1B do not show the intake and exhaust valves 130, 150 in full motion relative to the pistons 160 and all valves are shown closed. The pistons 160 reciprocate to draw intake air, including EGR when appropriate, into the cylinder through the intake port INTAKE1 when valve head 131 is moved out of the way. A fuel injector 310 is shown in FIG. 2, which is also called herein a gasoline/diesel injector GDI. Spark plug SP is not shown in FIG. 2 but can be included to ignite gasoline, while diesel can be compression ignited. Combustion can occur in the cylinder block 102, the combustion transferring force to the piston head, to the crankshaft 101 and out of the engine 100. Exhaust can exit the exhaust port EXH1 when valve 150 opens by lifting valve head 151 from the exhaust port.

Figure 15:
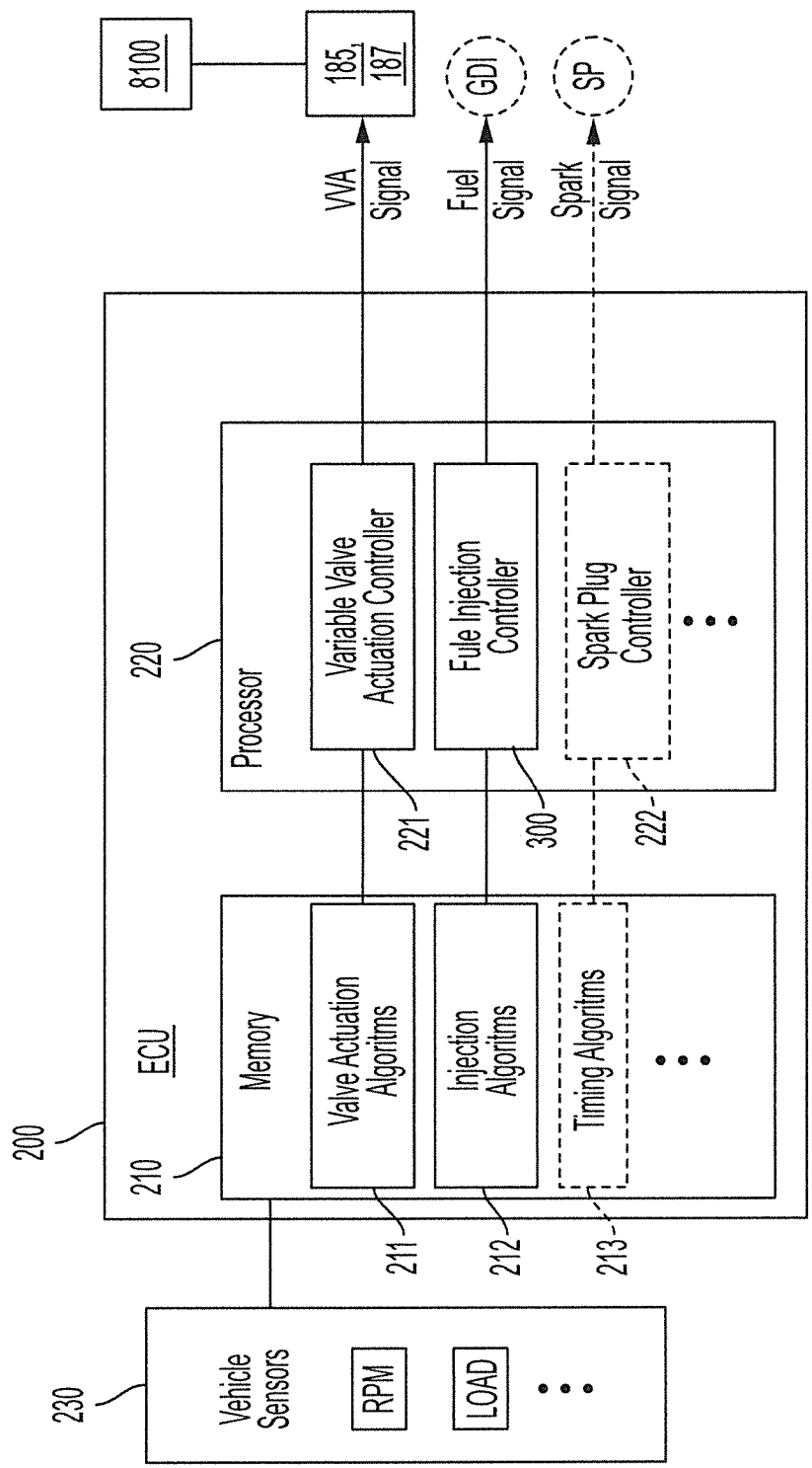
FIG. 15 is a schematic of a control system for implementing multi-mode valve lift techniques.

Electronic control unit ("ECU") 200 is shown schematically connected to the cylinder 1. FIG. 15 shows an ECU 200 in more detail. Vehicle sensors 230, such as load sensors LOAD, crankshaft rotations per minute sensors RPM, among others, can be distributed around the vehicle to collect data for selecting which zone of operation the engine 100 is operating in. Loaded idle ZONE 1, low speed, low load ZONE 2, high speed, low load ZONE 3, high load ZONE 4, and high speed, high load ZONE 5 are among zones of operation for the engine 100. Feeding sensed data to memory device 210 such as a RAM, ROM, ePROM, or other tangible storage means permits the distribution of the data for further processing, such as within processor 220. Memory 210 can comprise numerous algorithms for vehicle control, among them, valve actuation algorithms 211, injection algorithms 212, and timing algorithms 213. Valve actuation algorithms can be for enabling determination of which lift profiles to select given the collected vehicle data. The Variable valve actuation controller 221 can processed the collected data and the algorithm to output a variable valve actuation signal. The VVA signal can be fed to the implemented actuation mechanism such as the actuation rail 185 or the hydraulic supply 187. The injection algorithms 212 can be processed in processor 220 along with the collected data for enabling fuel injection timing and quantity determinations by fuel injection controller 300. A fuel signal can be output to the gasoline/diesel injector (fuel injector 310), including signals such as a zero fuel signal for cylinder deactivation mode ("CDA"), cylinder scavenging, multiple injections, rich or lean injections, among others. The techniques disclosed herein can be used in gasoline or diesel engines, and so in some scenarios, the spark plug SP is optional, while in other scenarios, it is mandatory. Timing algorithms 213 can be stored in the memory 210 for enabling determination of when to ignite fuel injected in to the cylinder. When CDA is selected, this can mean no ignition is signaled. Or, ignition can be delayed to phase with fuel injection timing and distributions. The timing algorithms and data concerning fuel injection can be processed in spark plug controller 222 to output a spark signal to the spark plug SP.

Various engine operation modes are available for a cylinder comprising two exhaust valves 150 and two intake valves 130. It is desired to provide a normal valve lift for nominal engine operation, a deactivated mode such as cylinder deactivation comprising the closing of all valves, and a special valve event, such early intake valve closing (EIVC), late exhaust valve opening (LEVO), or cylinder scavenging, among other techniques. Conventional cylinder set ups get complicated as to hardware to enable the three modes on a cylinder and the complexity increases for a multiple-intake and multiple-exhaust valve cylinder.

Figure 10:
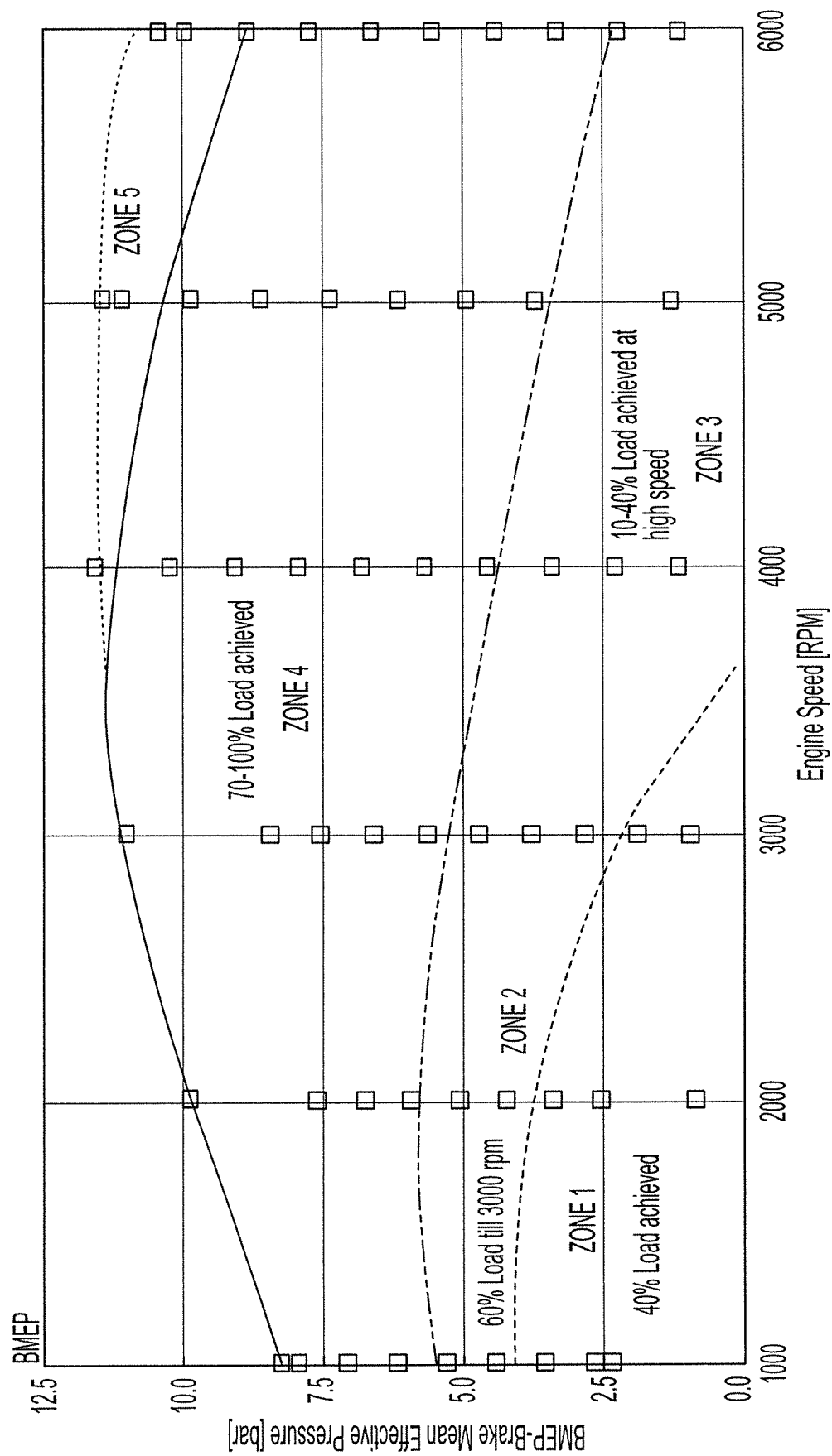
FIGS. 10 and 11 are graphs of engine operation zones.
Figure 11:
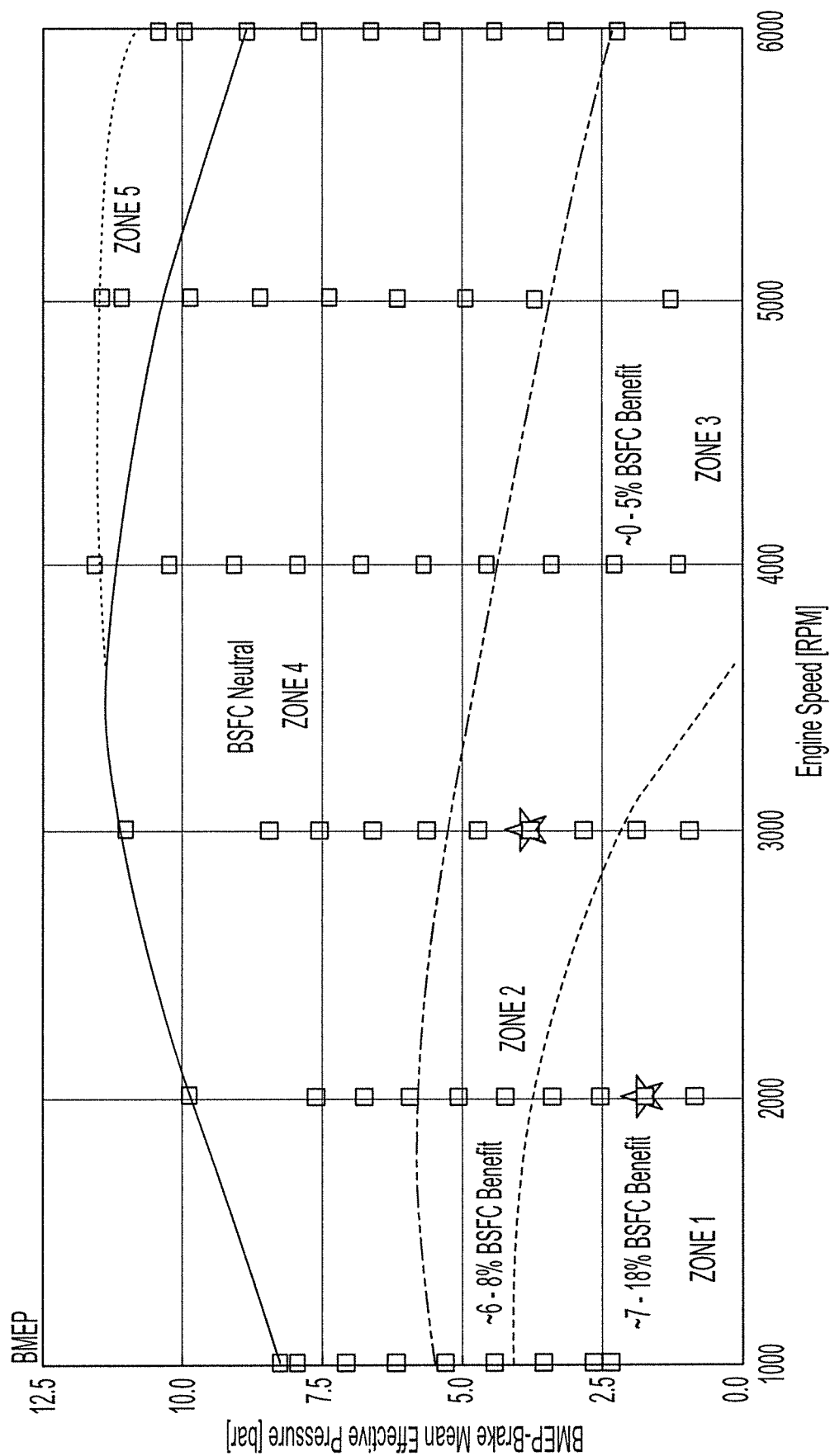

With the help of the ECU 200, it is possible to actuate an engine system across the several zones 1-5. And, it is possible to switch among engine operation modes to achieve fuel economy benefits. For example, with programming, the collected data can result in variable valve actuations where some cylinders are operated in cylinder deactivation mode to reduce fuel use. By switching 2 of 4 cylinders to CDA mode, it is possible to achieve the ZONE 1 load requirements in brake mean effective pressure shown in FIG. 10 and the benefits in brake specific fuel consumption shown in FIG. 11. By using Miller cycle combustion techniques and including Early Intake Valve Closure ("EIVC"), it is possible to achieve the ZONE 2 & ZONE 3 load requirements in brake mean effective pressure shown in FIG. 10 and the benefits in brake specific fuel consumption shown in FIG. 11. Using a valvetrain design according to the alternatives disclosed in FIGS. 5A-9C, an operating in a modified normal mode as discussed in FIGS. 6A, 6B, 8B, 8C, & 9B, it is possible to achieve the ZONE 4 load requirements in brake mean effective pressure shown in FIG. 10 and the neutral benefits in brake specific fuel consumption shown in FIG. 11. In some cases, the valvetrain so designed for three modes of operation cannot achieve a small ZONE 5 load capability of the engine.

Figure 5B:
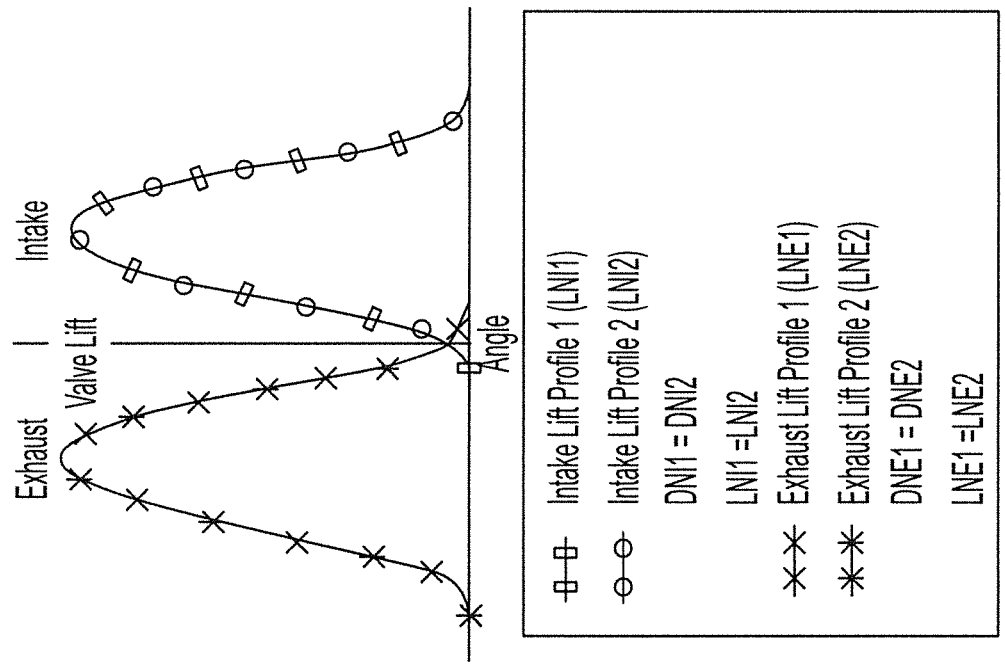
Figure 5A:
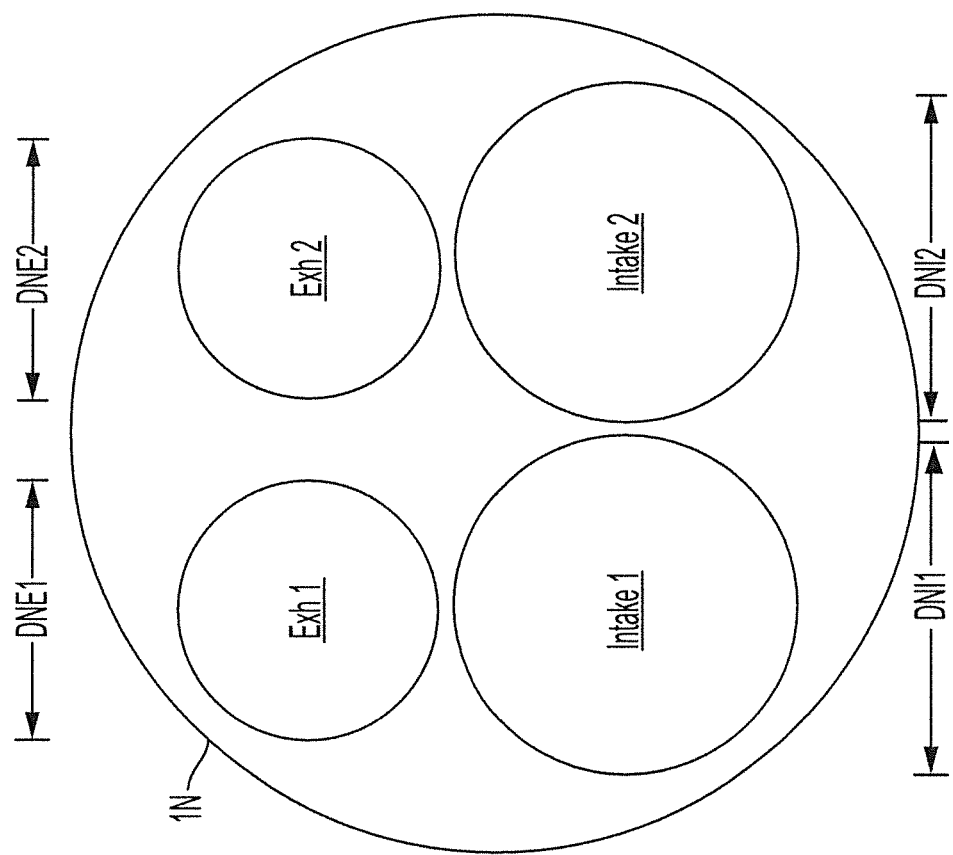

To provide some relationship among the lift types, a "normal" or "nominal" lift mode is disclosed in FIGS. 5A & 5B for a standard cylinder. The cylinder roof 161 is shown in schematic for a first normal cylinder 1N. The nominal intake lift profile LNI1 for intake valve 1 is the same as the nominal intake lift profile LNI2 for intake valve 2 and the curves for the lift profiles co-extend. Also, the first intake diameter DNI1 of first intake port INTAKE1 is the same as the second intake diameter DNI2 of second intake port INTAKE2. The nominal exhaust lift profile LNE1 for exhaust valve 1 is the same as the nominal exhaust lift profile LNE2 for exhaust valve 2 and the curves for the lift profiles co-extend. Also, the first exhaust diameter DNE1 of first exhaust port EXH1 is the same as the second exhaust diameter DNE2 for exhaust port 2. As discussed more below, this normal or nominal lift mode can be implemented on some but not all valves, or some but not all cylinders of the multi-cylinder engine. Using a roller finger follower ("RFF") 7100 on both valves of a cylinder can enable the lift profile shown in FIG. 5B, and such arrangement is shown for all of the exhaust valves 150 of cylinders 2 & 3 in FIGS. 1A & 1B.

Figure 6B:
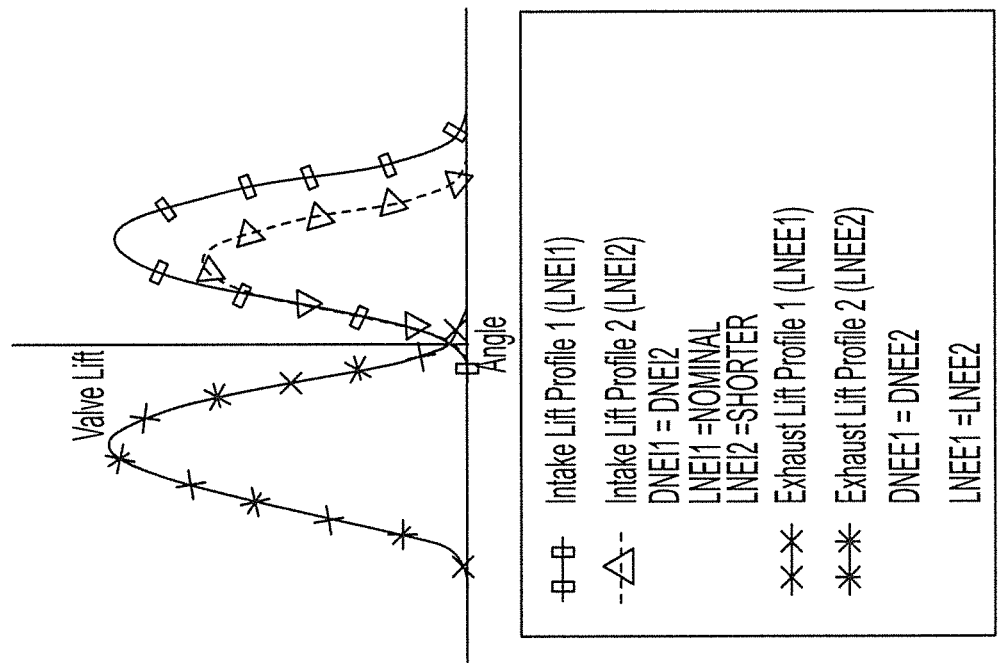
Figure 6A:
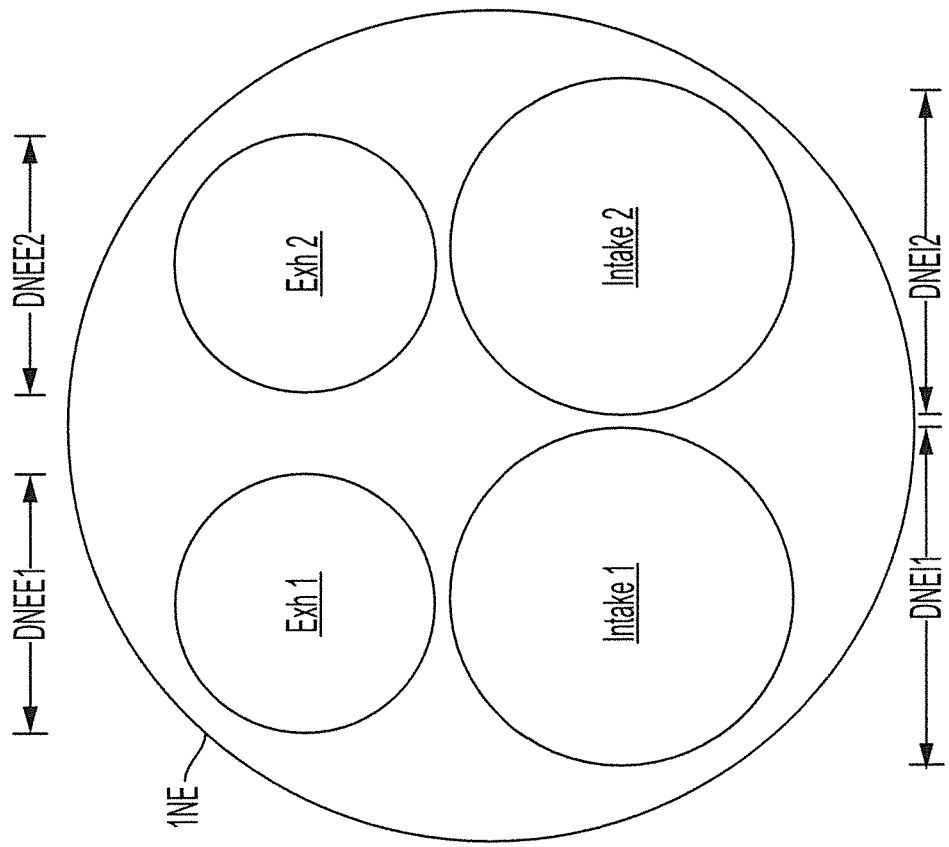

Turning to FIGS. 6A & 6B, a normal Early Intake Valve Closing ("EIVC") valve combination is shown. The cylinder roof 161 is shown in schematic for a first normal EIVC cylinder 1NE. The nominal intake lift profile LNEI1 for intake valve 1 is not the same as the shorter intake lift profile LNEI2 for intake valve 2 and so the curves for the lift profiles do not co-extend. The first intake diameter DNEI1 of first intake port INTAKE1 is the same as the second intake diameter DNEI2 of second intake port INTAKE2. The nominal exhaust lift profile LNEE1 for exhaust valve 1 is the same as the nominal exhaust lift profile LNEE2 for exhaust valve 2 and the curves for the lift profiles co-extend. Also, the first exhaust diameter DNEE1 of first exhaust port EXH1 is the same as the second exhaust diameter DNEE2 for exhaust port 2. When it is desired to operate an EIVC mode using this cylinder combination, the roller finger follower 7100 can be used on the exhaust valves and on intake valve 2. Then, a switching roller finger follower ("SRFF") 8100 can be used on the first intake valve. When nominal lift is desired, the SRFF 8100 is latched for full valve lift of both intake valves according to the illustrated intake lift profiles 1 & 2 ("LNEI1" & "LNEI2). But, when EIVC is desired, the SRFF 8100 can be switched to a lost motion lift mode to eliminate intake lift profile 1 (LNEI1). Such arrangement can be achieved as shown for the intake valves 130 of cylinders 2 & 3 in FIGS. 1A & 1B.

FIGS. 7A & 7B illustrate full CDA mode where all valve experience lost motion or zero valve lift. The cylinder roof 161 is shown in schematic for a first normal CDA cylinder 1C. The deactivated intake lift profile LNCI1 for intake valve 1 is the same as the deactivated intake lift profile LNCI2 for intake valve 2 and so the curves are flat-lines for the lift profiles and co-extend. The first intake diameter DNCI1 of first intake port INTAKE1 is the same as the second intake diameter DNCI2 of second intake port INTAKE2. The deactivated exhaust lift profile LNCE1 for exhaust valve 1 is the same as the deactivated exhaust lift profile LNCE2 for exhaust valve 2 and the curves for the lift profiles co-extend. Also, the first exhaust diameter DNCE1 of first exhaust port EXH1 is the same as the second exhaust diameter DNCE2 for exhaust port 2. When it is desired to operate a CDA mode using this cylinder combination, the switching roller finger follower 8100 can be used on all the exhaust valves and on all the intake valves. When CDA is desired, the SRFF 8100 can be switched to a lost motion lift mode to eliminate valve lift and the flat-line lift profiles can be achieved. Lost motion can be achieved as by unlatching the SRFF and letting the inner arm 8700 swing down without moving the valves. When a nominal or other lift is desired, the SRFF 8100 is latched for the selected valve lift. Such arrangement can be achieved by properly configuring the SRFF for the intake valves 130 and exhaust valves of cylinders 1 & 4 in FIGS. 1A & 1B.

Figure 8B:
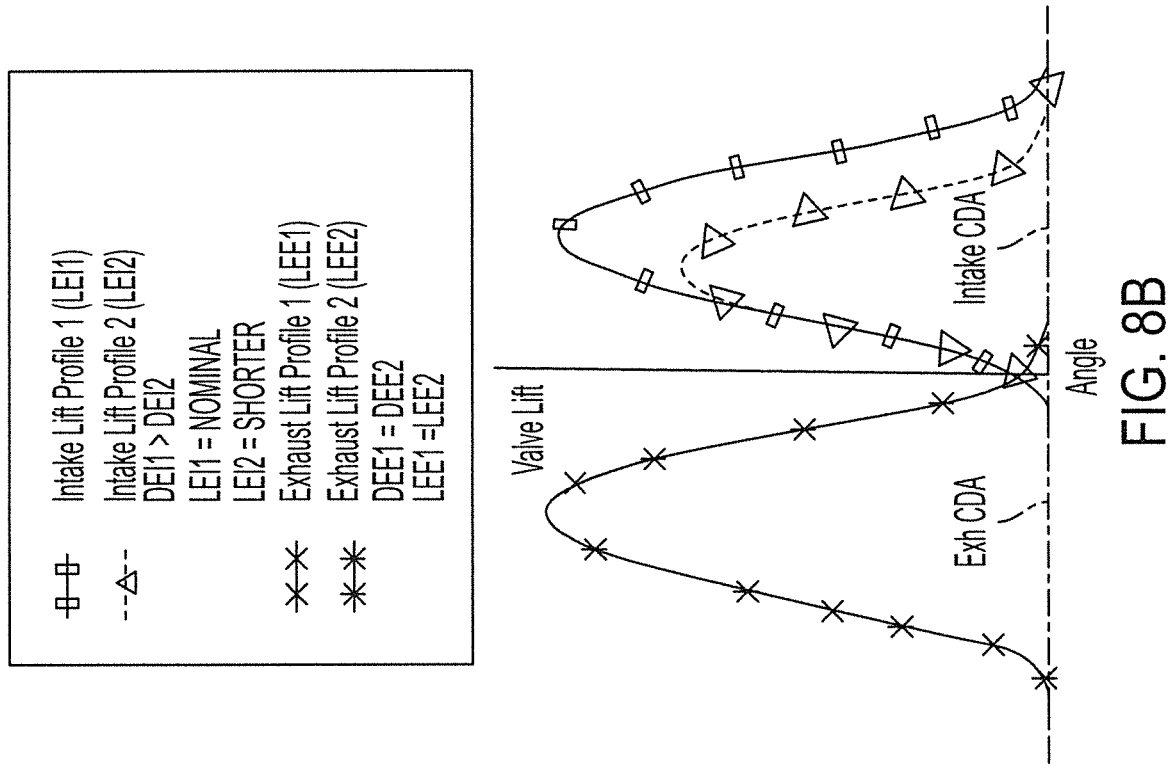
Figure 8A:
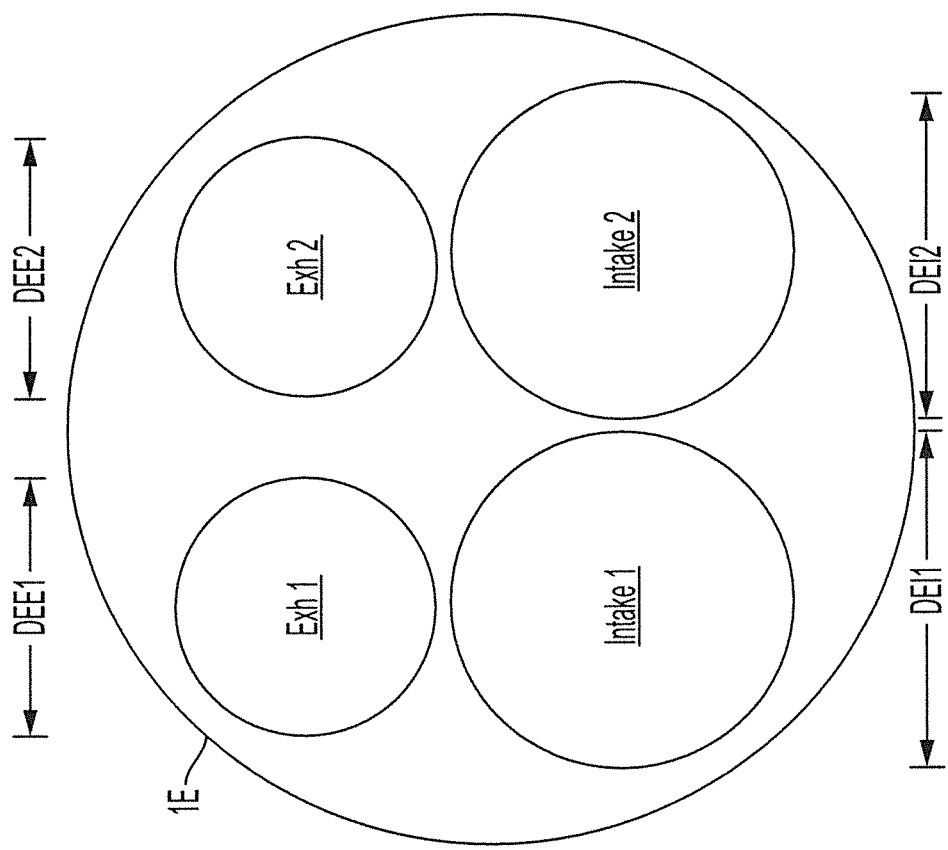
Figure 8C:
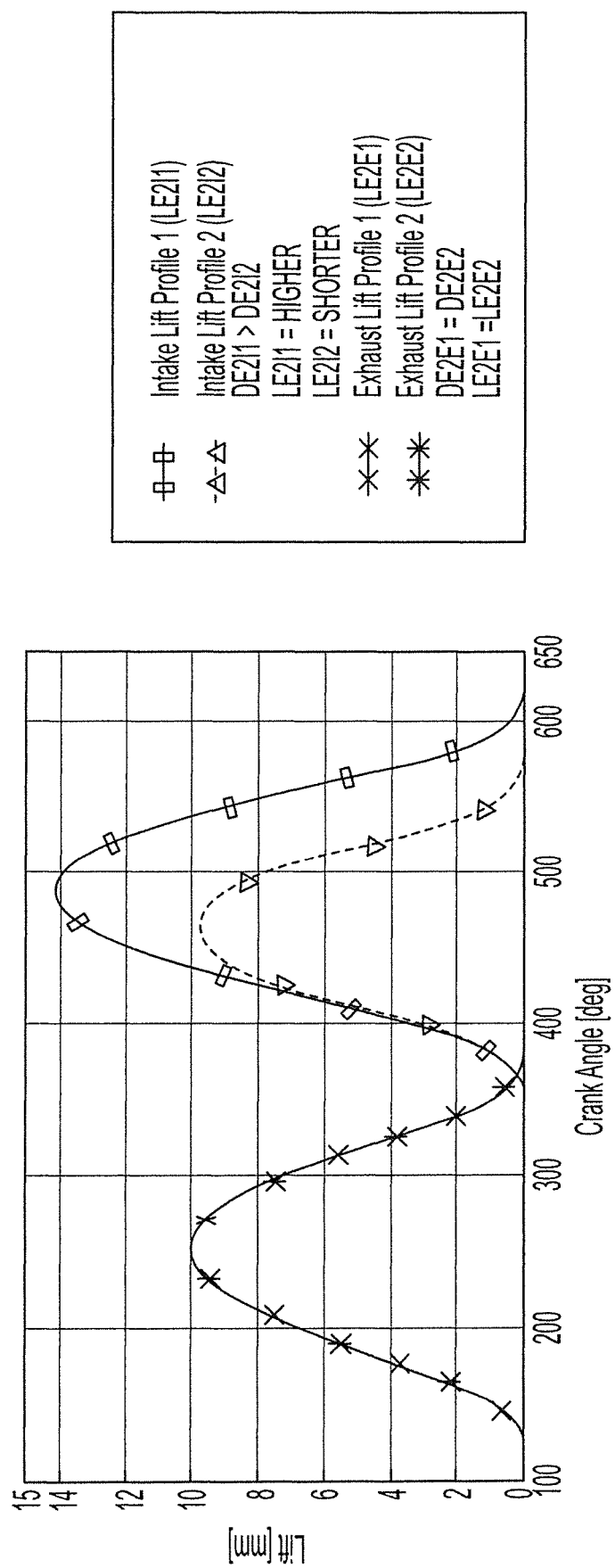
Figure 8D:
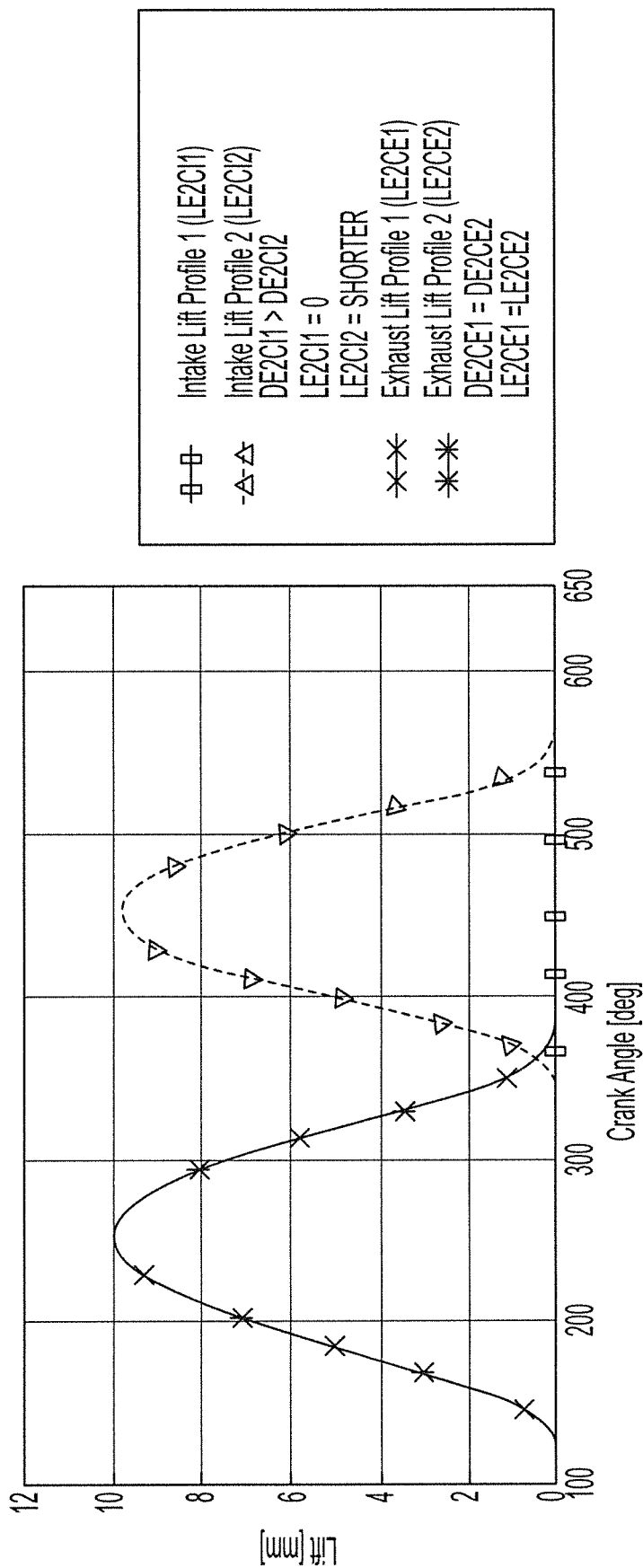

FIG. 8A shows a new configuration on the cylinder roof 161 for EIVC techniques disclosed in FIG. 8B-8D. The first intake port INTAKE1 has intake port diameter DEI1 greater than intake port diameter DEI2 of second intake port INTAKE2. This permits a greater flow of air in to first intake port 1 INTAKE1 compared to second intake port INTAKE2. Then, when second lift profile is implemented, as below for EIVC mode, the larger diameter first intake port 1 INTAKE1 can have a necessary flow area for adequate intake of air during the EIVC event. First and second exhaust port diameters DEE1 & DEE2 for the first and second exhaust ports EXH1, EXH2 are equal. It is possible to implement the nominal lift profile LNI1 of FIG. 5B on the first intake valve. Intake valve 1 has a switchable lift profile enabled by SRFF 8100, the nominal lift profile for the first lift profile of intake valve 1 (LEI1) is the same height as the nominal exhaust valve lift profiles (LEE1 & LEE2). To enable an EIVC event, second intake valve has a first lift profile LEI2. The second lift profile of intake valve 1 and the second lift profile of intake valve 2 are zero lift height, lost motion, or CDA mode indicated by the flat dashed line INTAKE CDA. The second lift profile of exhaust valves 1 & 2 are also zero lift height, lost motion, or CDA mode indicated by the flat dashed line EXHAUST CDA. The cylinder can operate in 3 modes:
1. a normal mode comprising all of the first lift profiles of the intake and exhaust valves,
2. an EIVC mode comprising the first lift profiles of the second intake valve (LEI2) and exhaust valves (LEE1, LEE2), plus the second lift profile of the first intake valve (INTAKE CDA), and
3. a CDA mode comprising the second lift profiles of the intake and exhaust valves (EXH CDA, INTAKE CDA).

Variations on the lift profile can be used. For example, in FIG. 8C, a first intake lift profile for first intake valve (LE2I1) is much higher than the intake lift profile for second intake valve (LE2I2). The larger diameter first intake port INTAKE1 has a larger valve opening to increase flow time. Now, when the first intake lift profile is eliminated by switching to the second intake lift profile (CDA mode for valve 1) a partial load condition can be achieved creating "an engine in an engine." Less air is taken through the smaller second intake port INTAKE2. This impacts the displacement of the engine, and the technique can be used to improve brake specific fuel consumption ("BSFC") as in FIG. 11. As a variant, equal diameter intake ports can alternatively be used as part of the partial load strategy. Additional benefits inure using this strategy in that swirl is reduced in the cylinder and more even flow from input ports to output ports is achieved.

As shown in FIG. 8D, when the first lift profile of the first intake valve is eliminated and the second lift profile (CDA mode) is used on the first intake valve, the second intake valve can remain in an EIVC mode with a lift profile near the same height as the exhaust valve lift profiles.

The disparate first and second lift height concepts can be expanded. An inverse of FIG. 8B can be implemented to enable Late Exhaust Valve Opening (LEVO). Also, the teachings of FIG. 8B can be duplicated to enable both EIVC and LEVO, and this is shown in FIGS. 8F & 8G. The cylinder roof in FIG. 8F is shown with diameter D1 of intake port INTAKE1 larger than diameter D2 of intake port INTAKE2 (D1>D2). And, diameter D3 of exhaust port EXH1 is smaller than diameter D4 of exhaust port D4. This permits variations in displacement and air flow. LEVO can be implemented as by first lift profile of second exhaust valve (LL1E2) being shorter than first lift profile of first exhaust valve (LL1E1). Second lift profiles of the first and second exhaust valves (LL2E1, LL2E2) can comprise zero lift or CDA mode. First lift profile of first intake valve (LE1I1) is higher than the shorter first lift profile of second intake valve (LE1I2). Second lift profiles of the first and second intake valves (LE2I1, LE2I2) can comprise zero lift or CDA mode. The cylinder can be actuated through four engine operation modes with a small overhead footprint:
4. a normal mode comprising all of the first lift profiles of the intake and exhaust valves,
5. an EIVC mode comprising the first lift profile of the second intake valve (LE1I2) and exhaust valves (LLE1, LLE2), plus the second lift profile of the first intake valve (LE2I1),
6. an LEVO mode comprising first lift profiles of the second exhaust valve (LL1E2), first lift profiles of both intake valves (LE1I1, LE1I2), and second lift profile of first exhaust valve (LL2E1), and
7. a CDA mode comprising the second lift profiles of the intake and exhaust valves (LL2E1, LL2E2, LE2I1, LE2I2).

Figure 8E:
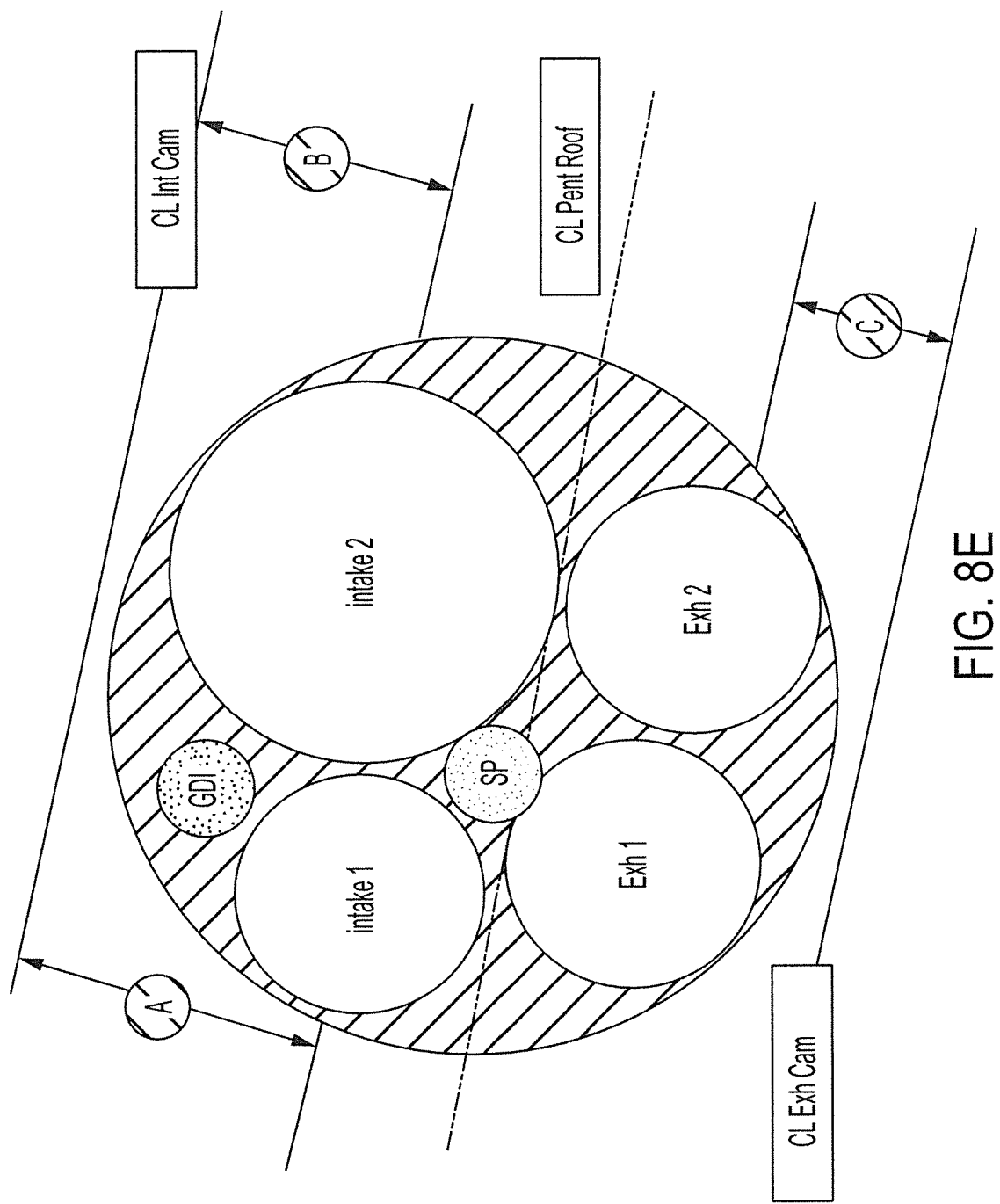
Figure 8F:
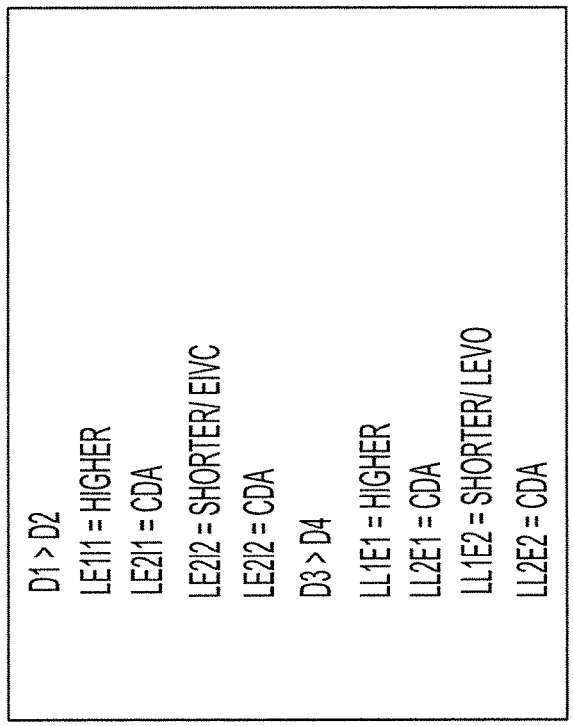
Figure 8G:
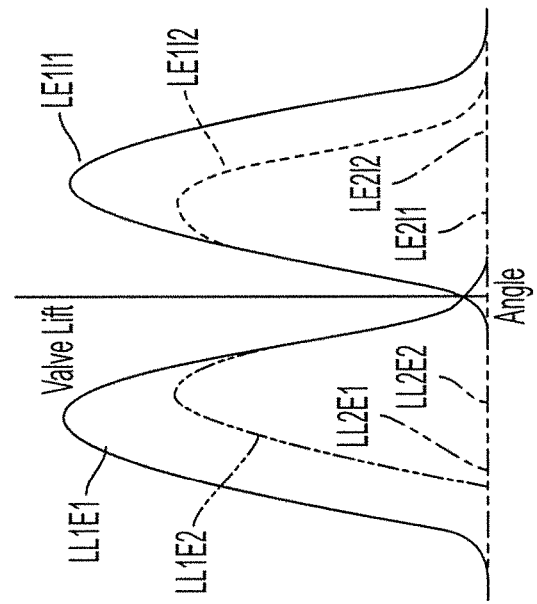

FIG. 8E shows that it can be necessary to move the Spark Plug SP and gasoline/diesel injector GDI in order to configure the cylinder for the disclosed techniques. When using equally sized intake openings and equally sized exhaust openings arranged over cylinder roof 161, a line across the cylinder roof can pass through the spark plug SP and can be said to bisect the spark plug SP. The gasoline/diesel injector GDI can be centered between and peripheral to the intake openings. The gasoline/diesel injector GDI can also be centered with respect to the exhaust openings. The spark plug SP is centered between all of the openings. If a line were placed perpendicular to the cylinder roof line, it could be placed to bisect the gasoline/diesel injector GDI and the spark plug SP.

If in alternative aspects, the gasoline/diesel injector GDI and spark plug SP are rearranged to accommodate the larger intake port. The gasoline/diesel injector GDI can be centered with respect to the intake openings, but can no longer be said to be centered with respect to the exhaust ports. The spark SP is between each of the pairs of openings. The dashed line for the center of the cylinder roof is shown, but the spark SP is no longer bisected by the cylinder roof line CL PENT ROOF. A line perpendicular to the roof line would not bisect both the spark plug SP & the gasoline/diesel injector GDI. A line that could intersect the roof line, the spark plug SP & the gasoline/diesel injector GDI would need to be askew with respect to the roof line CL PENT ROOF. The spark plug SP is not centered with respect to the exhaust openings and could be said to be askew with respect to the exhaust openings. Inverse modifications to the spark plug and gasoline/diesel injector can be made when implementing the larger exhaust port, or both the larger intake port with the larger exhaust port.

In other alternatives, it is possible to reduce the diameter of one intake port when increasing the diameter of the other. Such changes can be made with changes in lift profile height, so as to maintain the same curtain area and flow conditions as the baseline.

While it is possible to perform the disclosed techniques with different rocker arm arrangements on each valve, it is also possible to reduce the complexity of the hardware by implementing the same enabling hardware on each of the four pairs of valves, reducing the over-head complexity of the engine block. Modularity in customer design is enabled, since an engine can have as few or as many SRFFs or RFFs as desired for the number of valves and number of cylinders on the engine. Regardless of the uniformity of the overhead actuators, it is possible to implement the techniques FIGS. 5A-12.

FIGS. 1A & 1B comprises examples of enabling overhead structures. In the examples, the overhead structures are optimized for switching between normal operation mode (1st mode) and cylinder deactivation mode (CDA) ($2^{nd}$ mode). The two-mode overhead structure can be used to implement three modes on an engine cylinder, permitting a small overhead footprint.

A cam rail 182, 183 comprising cam lobes 181 for desired valve lifts can be reliably adjusted for the special valve event. In each example in FIG. 1B, at least one valve-actuated opening in to the cylinder is larger than its neighboring valve-actuated opening. In Example 1, intake opening 1 is larger than intake opening 2. The larger intake opening is always opened and closed with a valve with a valve head 1312 via a cam lobe profile designed for the special event, in this instance EIVC mode. The larger opening size D1 permits adequate filling of the cylinder during normal operation mode, despite the early closing of the larger intake opening. Intake opening 2 can have a higher lift and longer duration lift that intake opening 1, which height and duration can be varied per the application. The valve affiliated with intake opening 2 can follow a normal lift profile, which can be terminated as by initiating cylinder deactivation mode ($2^{nd}$ mode) for that valve. When the intake opening 1 and intake opening 2 are opening and closing during the same engine cycle, they are operating "normally" ($1^{st}$ mode).

Cylinder deactivation mode ($2^{nd}$ mode) can be implemented on the cylinder by deactivating all of the valves affiliated with the cylinder, thus blocking the intake and exhaust openings. The engine can cycle in CDA mode as programmed.

A special mode ($3^{rd}$ mode), such as EIVC, can be implemented by deactivating only the intake valve affiliated with intake opening 2. The exhaust valves and remaining active intake valve follow their normal lift profiles. In the case of the larger intake opening, the affiliated valve follows its normal lift profile which is also the special event profile. The technology that permits CDA for the cylinder then also enables a special event for the cylinder by terminating only the valve action for that portion of the intake valve lift profile that is "normal."

Figure 9A:
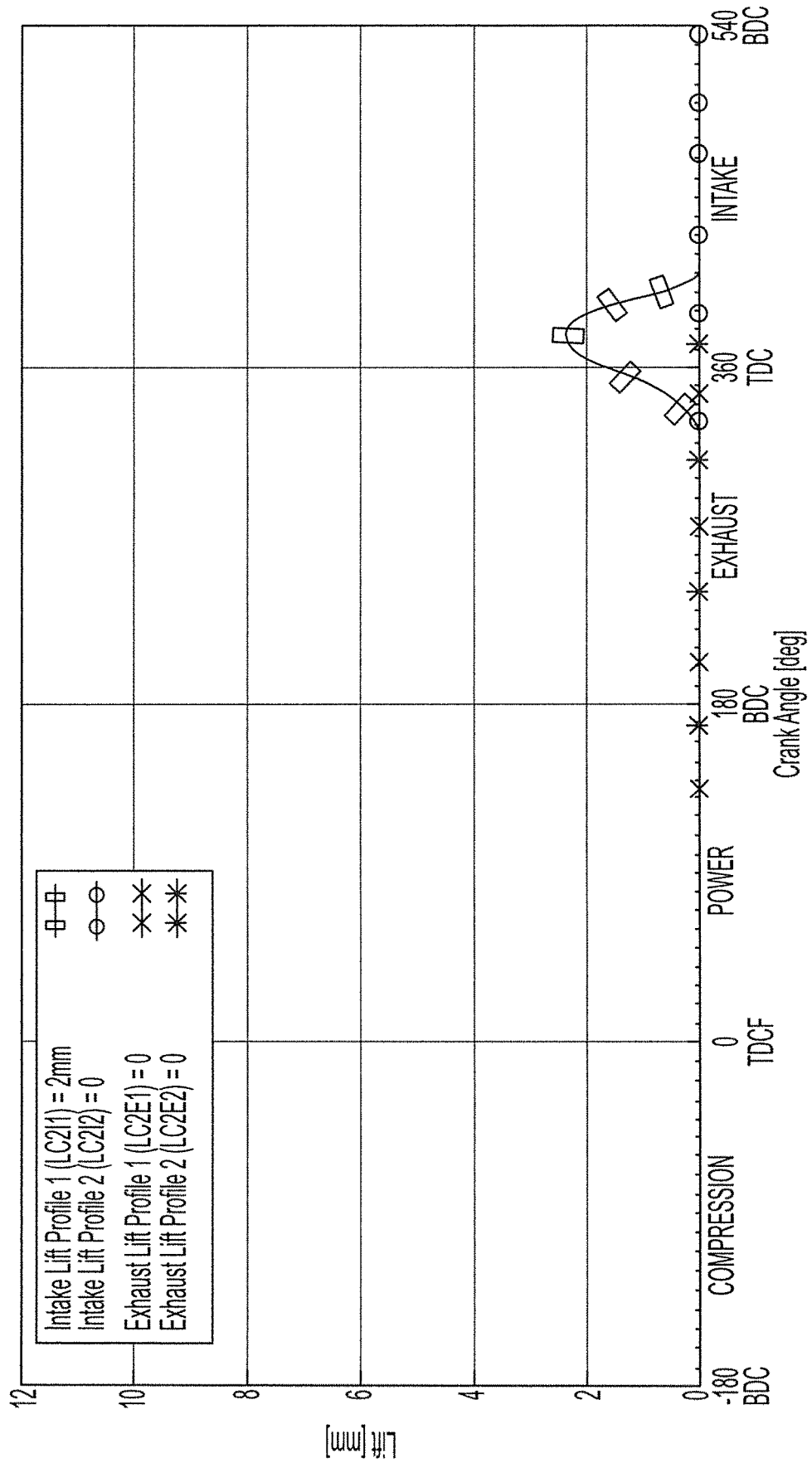
Figure 9B:
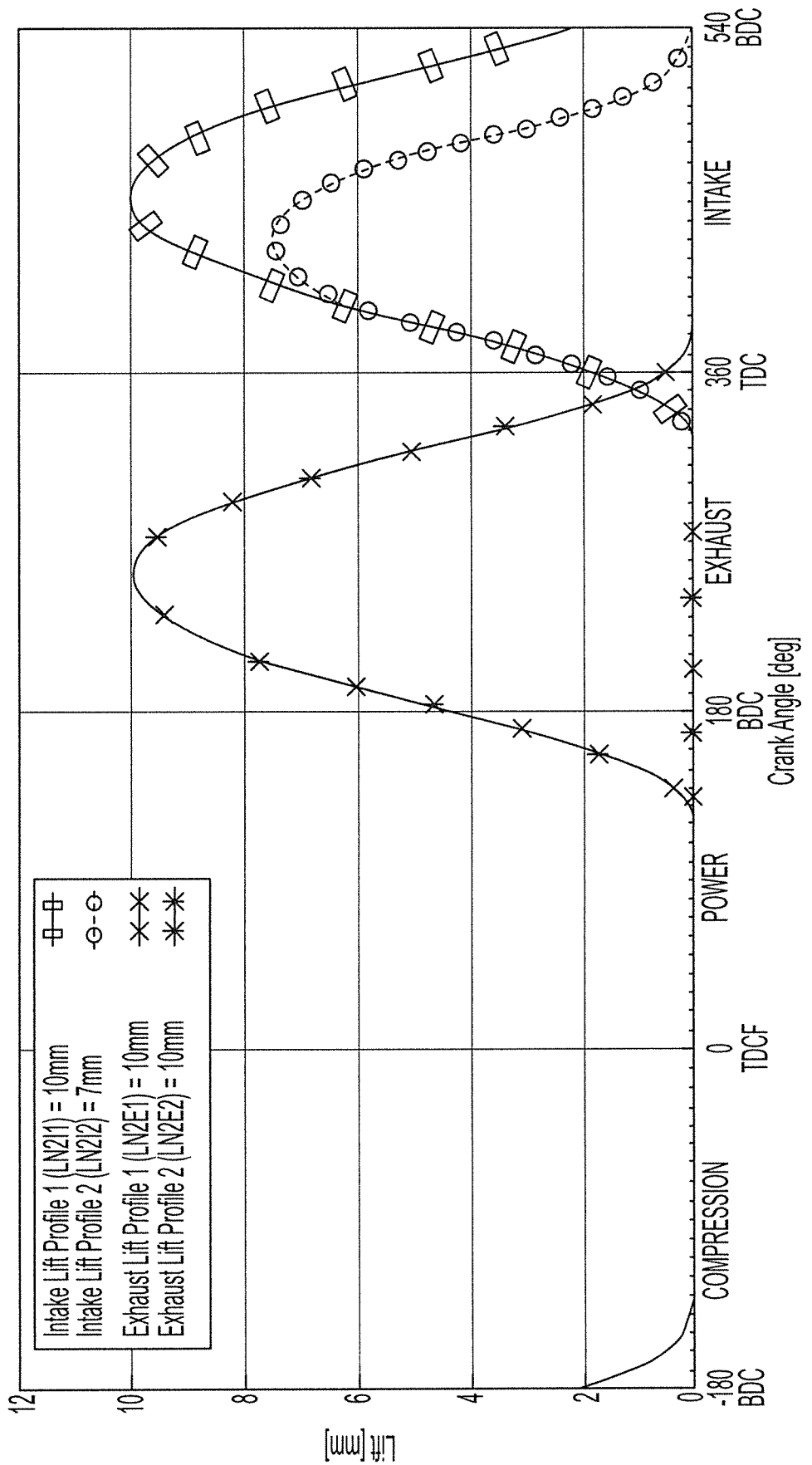
Figure 9C:
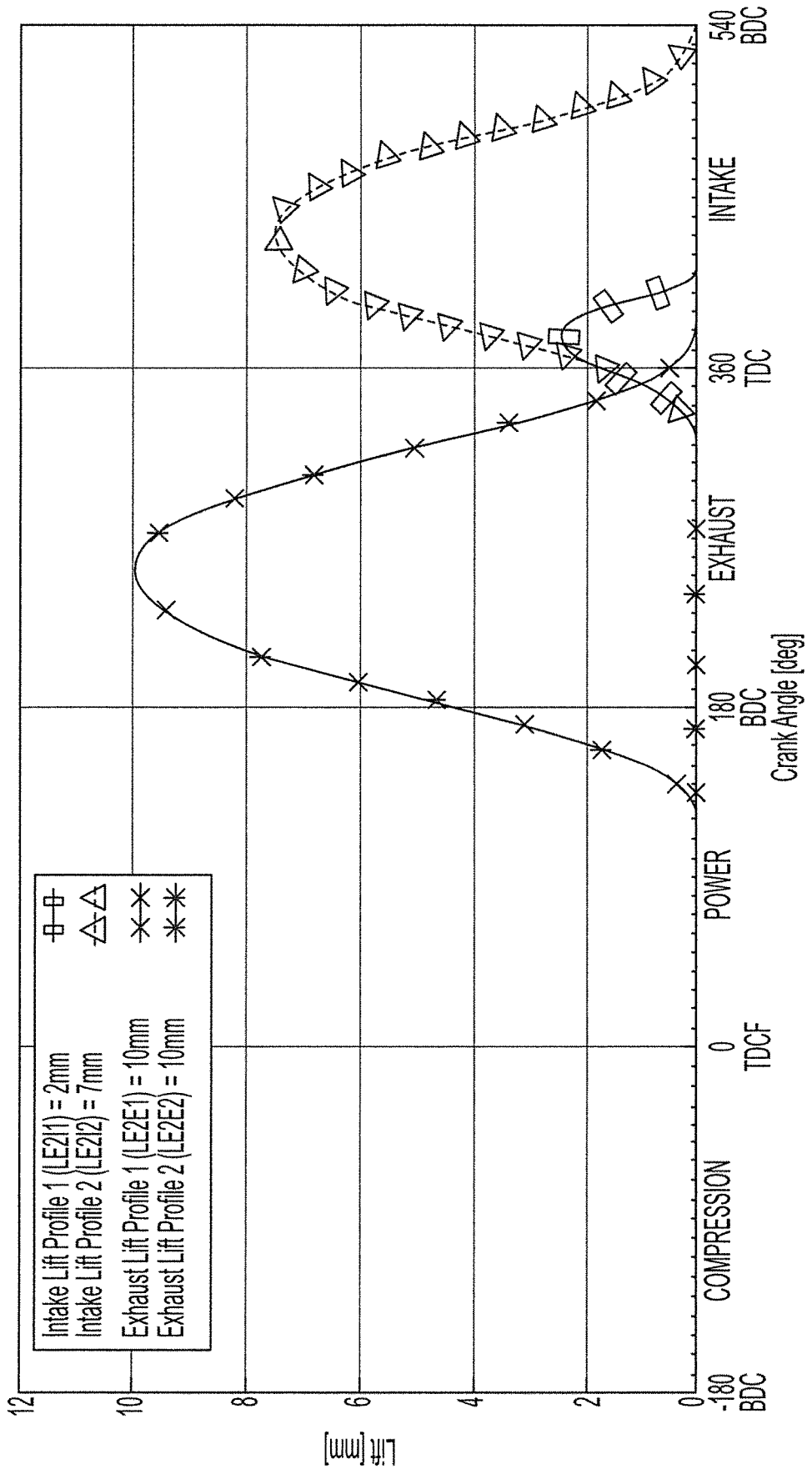
Figure 13:
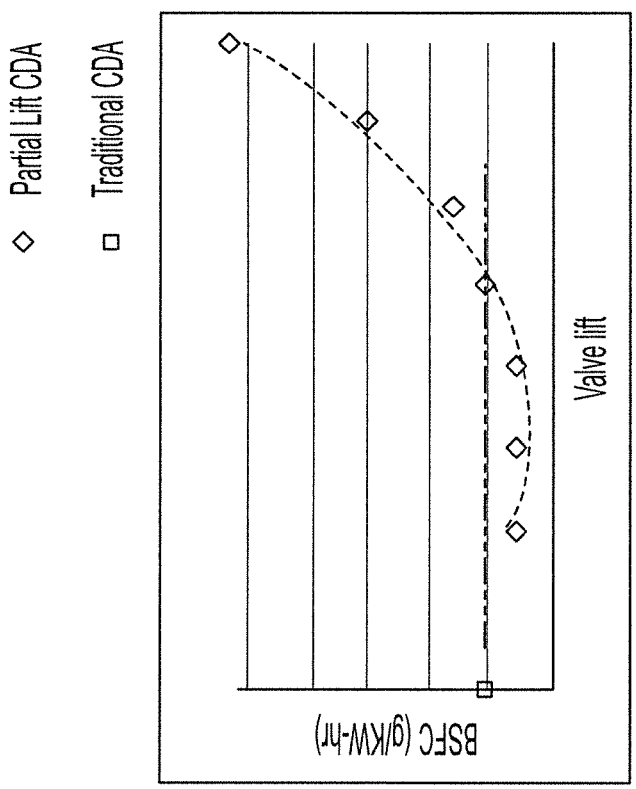
FIGS. 13 & 14 are graphs explaining partial lift cylinder deactivation mode versus full cylinder deactivation mode.

Turning to FIG. 9A, a partial lift CDA mode is disclosed. Each exhaust valve has its lift profile set to full CDA mode and the second intake valve lift profile is set to full CDA mode. "Full CDA mode," can be described as complete closing of the intake and exhaust valves with no fueling to the cylinder. Partial lift CDA can be described as a having one or more valves lift, but such that the brake specific fuel consumption ("BSFC") gains afforded by using full CDA mode are not lost, as indicated in FIG. 13. A square indicates the BSFC of traditional, or full, CDA mode. A cylinder with all valves closed and no fueling experiences the BSFC of the square. Below the solid line, a cylinder that has at least one valve open partially while the piston reciprocates will have improved BSFC, while above the solid line, the valve lift increasing according to the diamond curve will progressively move away from the BSFC improvements of full CDA.

Figure 14:
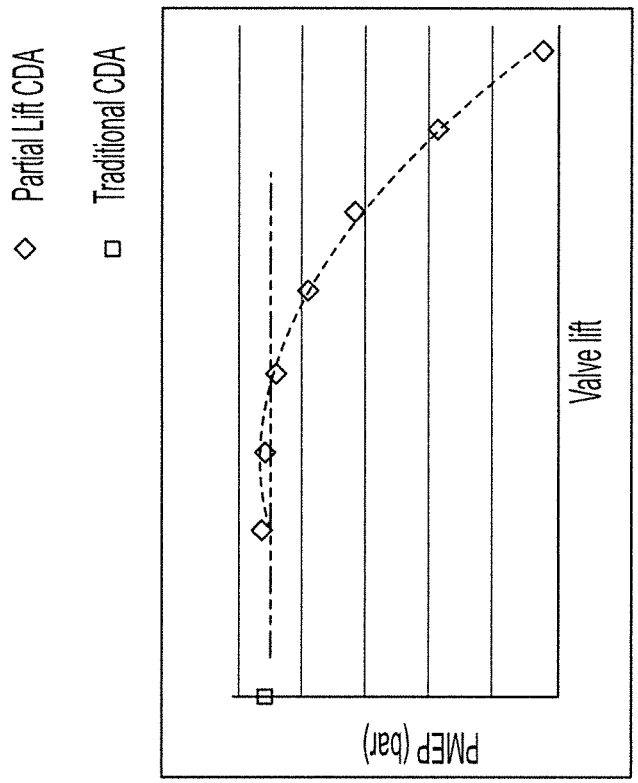

Put another way, partial lift CDA comprises one or more valves lifting during a no-fueling piston reciprocation, but such that the Pumping Mean Effective Pressure (PMEP) in the cylinder is at or above that experienced by the full CDA mode scenario. At the solid line in FIG. 14, a valve lifting while the other valves are closed and while the fuel is shut off will enable the cylinder to have an identical PMEP as is experienced during full CDA mode. Above the solid line in FIG. 14, the PMEP is greater than that experienced during full CDA mode, but once the valve lifts to a height that causes the diamond curve to pass below the solid line in FIG. 14, the benefits of full CDA mode slip progressively away.

While partial lift CDA can comprise other values based on the engine characteristics, such as the flow through the intake and exhaust ports, cylinder size, engine displacement, etc., FIG. 9A shows a 2 mm lift profile for intake lift profile 1 (LC2I1.) It is not intended to limit the invention to only a 2 mm lift, rather to provide via FIG. 9A a working example, with other lift profile values determinable by knowing the full CDA mode benefits and engine characteristics.

Figure 12:
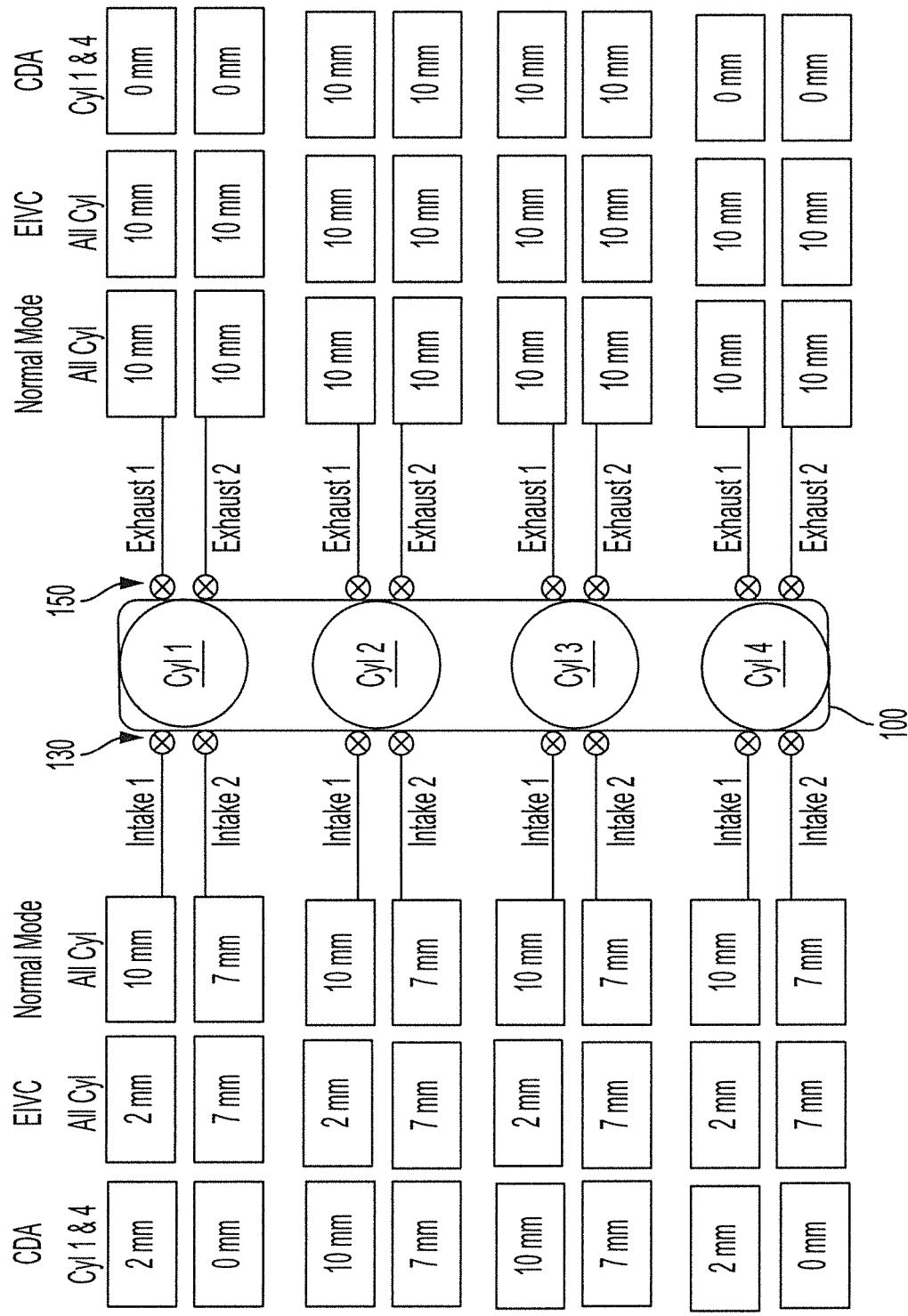
FIG. 12 is a diagram of multi-mode valve lifts with respect to a schematic engine.

The teachings of FIG. 9A can be combined in beneficial ways. A matrix of data relative to an engine schematic shows that three engine operating modes can be implemented on engine 100: 2-cylinder CDA mode, 4-cylinder EIVC mode, and all-cylinder Normal mode. The 2-cylinder CDA mode of FIG. 12 comprises both full CDA mode and partial lift CDA mode. Full CDA mode is implemented on second intake valves of cylinders 1 & 4 and full CDA mode is implemented on all exhaust valves of cylinders 1 & 4. However, the partial lift CDA is implemented on the first intake valves of cylinders 1 & 4. The valves are lifted 2 millimeters during the CDA mode. The CDA columns for the intake valves and for the exhaust valves for cylinders 1 & 4 would yield an outcome as illustrated in FIG. 9A. While only half-engine CDA is illustrated in FIG. 12, full engine CDA could be enabled by duplicating the design for cylinders 1 & 4 on to Cylinders 2 & 3. Instead, FIG. 12 shows roller finger followers used to maintain a single lift profile on all exhaust valves for cylinders 2 & 3 and on second intake valves of cylinders 2 & 3.

The 2 mm lift profile for first intake valve of cylinders 1 & 4 can also be the selected lift profile for implementing EIVC on the engine 100. The lower, shorter lift can be selected as the lift profile for first intake valve of cylinders 1 & 4. Instead of being deactivated, as in the earlier examples, the low lift on the first intake valve of each cylinder permits intake air to flow in to the corresponding cylinder. This counters swirl in the cylinder and encourages a straighter flow from intake ports to exhaust ports for the cylinder. Since EIVC is selected for all cylinders, the valve lift profiles shown in FIG. 9C can be seen for all four EIVC cylinders. The first intake valve of each cylinder has a low 2 mm lift profile and the second intake valve of the cylinders has a medium 7 mm lift profile. Because some of the rocker arms are switchable and some are not, the overhead valvetrain receives actuation signals as necessary to switch between the CDA mode and the EIVC mode.

The third mode, normal mode, can be seen for all cylinders. The valve lift profiles for normal mode can be seen in FIG. 9B. A high lift profile LN2I1 is selected for the lift profile of the first intake valve of cylinders 1-4. A lower lift profile is selected for the second intake profile LN2I2 for the second valve of the cylinders 1-4. The normal mode benefits from having more air available to flow into the cylinder than the other modes described in FIG. 12.

Several benefits inure. For example, going from the highest lift profile in the system to a zero lift would require greater spring forces (a larger spring) to return the zero lift configuration to the high lift configuration. By having the 2 mm lift, the disparity in lift heights is lessened. The spring can be smaller, resulting in easier packaging. In cases where swirl is not desired, the 2 mm lift benefits cylinder flow by promoting straight movement of intake air toward Exhaust.

Numerous examples of multi-mode engine systems have been disclosed herein, such systems usable for both gasoline and diesel engines. It has been shown beneficial to offer multiple operation modes on a single valvetrain. For example, a combination of cylinder deactivation ("CDA") and Miller cycle combustion provides operation efficiency gains that cannot be achieved using the techniques separately. The two techniques overlap for a portion of the engine operating range. Adding a third technique such as EIVC permits high efficiency for the full engine operating range. Benefits for the 3 mode operation are identifiable, with the option for a device with 2 intake valves that have the same diameter and lift and a device with 2 intakes at different diameters and lifts.

Other implementations will be apparent to those skilled in the art from consideration of the specification and practice of the examples disclosed herein.

What is claimed is:

1. An overhead cam engine system, comprising:
an in-line engine block comprising:
   a first cylinder including a first intake port, a second intake port, a first exhaust port, and a second exhaust port;
   a second cylinder including a third intake port, a fourth intake port, a third exhaust port, and a fourth exhaust port;
a reciprocating piston assembly comprising a first piston and a second piston configured to reciprocate in the first and second cylinders, respectively;
a rotating overhead intake cam rail comprising a first intake lobe configured to rotate above the first intake port, a second intake lobe configured to rotate above the second intake port, a third intake lobe configured to rotate above the third intake port, and a fourth intake lobe configured to rotate above the fourth intake port;
a rotating overhead exhaust cam rail comprising a first exhaust lobe configured to rotate above the first exhaust port, a second exhaust lobe configured to rotate above the second exhaust port, a third exhaust lobe configured to rotate above the third exhaust port, and a fourth exhaust lobe configured to rotate above the fourth exhaust port;
a first switching roller finger follower configured to follow the first intake lobe so as to actuate a first intake valve arranged in the first intake port, the first switching roller finger follower further configured to switch between a first lift profile and a second lift profile;
a second switching roller finger follower configured to follow the second intake lobe so as to actuate a second intake valve arranged in the second intake port, the second switching roller finger follower further configured to switch between a third lift profile and a fourth lift profile, the third and fourth lift profile being different than the first and second lift profile;
a third switching roller finger follower configured to follow the third intake lobe so as to actuate a third intake valve arranged in the third intake port, the third switching roller finger follower further configured to switch between the third lift profile and the fourth lift profile;
a non-switching roller finger follower configured to follow the fourth intake lobe so as to actuate a fourth intake valve arranged in the fourth intake port, the non-switching finger follower further configured to follow only the first lift profile; and
an actuation assembly connected to the first, second, and third switching roller finger followers, the actuation assembly configured to select between at least three intake lift modes of the first, second, and third intake valves using combinations of the first, second, third and fourth lift profiles.

2. The system of claim 1, wherein the first lift profile is a nominal lift profile, the second lift profile is a zero lift profile, the third lift profile is greater than the first lift profile, and the fourth lift profile is a partial lift profile less than the first lift profile.

3. The system of claim 2, wherein the first lift profile and the third lift profile are selected by the actuation assembly so as to implement a nominal intake lift mode of the at least three intake lift modes.

4. The system of claim 2, wherein the second lift profile and the fourth lift profile are selected by the actuation assembly so as to implement a deactivated intake lift mode of the at least three intake lift modes.

5. The system of claim 2, wherein the first lift profile and the fourth lift profile are selected by the actuation assembly so as to implement an early intake valve closing intake lift mode of the at least three intake lift modes.

6. The system of claim 1, wherein the first lift profile is a nominal lift profile, the second lift profile is a partial lift profile, the third lift profile is a partial lift profile different from the second lift profile, and the fourth lift profile is a zero lift profile.

7. The system of claim 6, wherein the second lift profile and the fourth lift profile are selected by the actuation assembly so as to implement a partial lift cylinder deactivation lift mode of the at least three intake lift modes.

8. The system of claim 1, wherein a diameter of the first intake port is greater than a diameter of the second intake port.

9. The system of claim 1, further comprising an exhaust switching roller finger follower coupled to a first exhaust valve arranged in the first exhaust port, wherein the actuation assembly is further connected to the exhaust switching roller finger follower so as to select between at least two exhaust lift modes of the first exhaust valve.

10. The system of claim 9, wherein the actuation assembly is configured to selectively deactivate the first exhaust valve via the exhaust switching roller finger follower.

11. The system of claim 9, wherein the at least two exhaust lift modes comprise a late exhaust valve opening lift profile and a nominal exhaust lift profile.

12. The system of claim 1, wherein the actuation assembly is further configured to deactivate the first, second, and third intake valves independently of each other.

13. An overhead cam engine system, comprising:
an in-line engine block comprising:

a first cylinder including a first intake port, a second intake port, a first exhaust port, and a second exhaust port;

a second cylinder including a third intake port, a fourth intake port, a third exhaust port, and a fourth exhaust port;

a reciprocating piston assembly comprising a first piston and a second piston configured to reciprocate in the first and second cylinders, respectively;

a rotating overhead intake cam rail comprising a first intake lobe configured to rotate above the first intake port, a second intake lobe configured to rotate above the second intake port, a third intake lobe configured to rotate above the third intake port, and a fourth intake lobe configured to rotate above the fourth intake port;

a rotating overhead exhaust cam rail comprising a first exhaust lobe configured to rotate above the first exhaust port, a second exhaust lobe configured to rotate above the second exhaust port, a third exhaust lobe configured to rotate above the third exhaust port, and a fourth exhaust lobe configured to rotate above the fourth exhaust port;

a first switching roller finger follower configured to follow the first exhaust lobe so as to actuate a first exhaust valve arranged in the first exhaust port, the first switching roller finger follower further configured to switch between a first lift profile and a second lift profile;

a second switching roller finger follower configured to follow the second exhaust lobe so as to actuate a second exhaust valve arranged in the second exhaust port, the second switching roller finger follower further configured to switch between a third lift profile and a fourth lift profile, the third and fourth lift profile being different than the first and second lift profile; and an actuation assembly connected to the first and second switching roller finger followers, the actuation assembly configured to select between at least three exhaust lift modes of the first and second exhaust valves using combinations of the first, second, third and fourth lift profiles, wherein the first lift profile is a nominal lift profile, the second lift profile is a zero lift profile, the third lift profile is a partial lift profile less than the first lift profile, and the fourth lift profile is a zero lift profile, and wherein the second lift profile and the third lift profile are selected by the actuation assembly so as to implement a late exhaust valve opening lift mode of the at least three exhaust lift modes.

\* \* \* \* \*